United States Patent [19]
Sprenger et al.

[11] Patent Number: 6,157,928
[45] Date of Patent: *Dec. 5, 2000

[54] APPARATUS AND SYSTEM FOR AN ADAPTIVE DATA MANAGEMENT ARCHITECTURE

[75] Inventors: Jeff H. Sprenger, Essex Junction, Vt.; George W. Gramley; Debbie A. Major, both of Dallas, Tex.; Richard A. Thompson, Carrollton, Tex.; Rob Hatcherson, Fort Worth, Tex.

[73] Assignee: M/A/R/C Inc., Irving, Tex.

[ * ] Notice: This patent is subject to a terminal disclaimer.

[21] Appl. No.: 09/428,781

[22] Filed: Oct. 27, 1999

Related U.S. Application Data

[63] Continuation-in-part of application No. 09/184,274, Oct. 31, 1998, Pat. No. 6,029,174.

[51] Int. Cl.[7] ..................................................... G06F 17/00
[52] U.S. Cl. .................................. 707/103; 707/3; 707/4; 707/5; 707/10; 707/104
[58] Field of Search .................................. 707/3, 4, 5, 10, 707/103, 104; 705/7; 379/88.25, 92.04

[56] References Cited

U.S. PATENT DOCUMENTS

| | | | |
|---|---|---|---|
| Re. 31,951 | 7/1985 | Johnson et al. | 379/92.04 |
| 4,603,232 | 7/1986 | Kurland et al. | 379/42.04 |
| 4,970,681 | 11/1990 | Bennett | 364/900 |
| 5,280,615 | 1/1994 | Church | 709/104 |
| 5,374,951 | 12/1994 | Welsh | 348/4 |
| 5,404,541 | 4/1995 | Hirosawa | 713/324 |
| 5,557,658 | 9/1996 | Gregorek et al. | 379/88.25 |
| 5,628,004 | 5/1997 | Gormley et al. | 707/104 |
| 5,640,505 | 6/1997 | Heam | 714/4 |
| 5,737,726 | 4/1998 | Cameron et al. | 705/7 |
| 5,761,529 | 6/1998 | Raji | 710/4 |
| 5,819,263 | 10/1998 | Bromley | 707/3 |
| 5,904,727 | 5/1999 | Prabhakaran | 701/208 |

OTHER PUBLICATIONS

Rubric "Corporate Backgrounder" Overview, Sep. 1996 pp. 1–31.
Rubric "Enterprise Marketing Automation" Overview, May 1998 pp. 1–3.

*Primary Examiner*—Thomas G. Black
*Assistant Examiner*—Diane D. Mizrahi
*Attorney, Agent, or Firm*—Sanford E. Warren, Jr.; Daniel J. Chalker; Gardere & Wynne, L.L.P.

[57] ABSTRACT

The present invention provides an apparatus, computer program and system for managing data. The computer program has at least one code segment to control system data stored in a first database and client data stored in a second database and several code segments that define a first set of objects linked to the first database, a second set of objects linked to the second database, and one or more minions. In addition, there are code segments to allow interaction with one or more agent processes. There is also a code segment to provide an interface between an external application and the code segment to manage the job queue.

40 Claims, 12 Drawing Sheets

APPARATUS AND SYSTEM FOR AN ADAPTIVE DATA MANAGEMENT ARCHITECTURE

RELATED APPLICATIONS

This is a continuation-in-part of Ser. No. 09/184,274 filed on Oct. 31, 1998 and now U.S. Pat. No. 6,029,174.

FIELD OF THE INVENTION

The present invention relates generally to data processing, and more particularly to an apparatus and system for an adaptive data management architecture.

BACKGROUND OF THE INVENTION

Without limiting the scope of the present invention, this background of the present invention is described in connection with an adaptive data management architecture for storing and analyzing marketing data. The present invention, however, is not limited to the management of marketing data. The present invention is applicable to the management of any type of data where it is desirable to implement a flexible architecture that is adaptable by changing rules rather than changing programs.

One goal of marketing is to acquire, retain and maximize relationships with customers. This goal has become increasingly more important to modem businesses as technological advances have created a global economy, reduced the time it takes to bring a product to market, and caused traditional distribution channels to shrink, as more direct communication channels with customers have emerged. As a result, businesses are attempting to clarify their understanding of a customer's brand and lifetime values while simultaneously attempting to analyze those values more quickly.

Despite significant advances in computer technology and these increasing market pressures, marketing data access and business logic are typically governed by inflexible computer systems. These systems typically have long development times and testing cycles and often rely on batch processing. As a result, the benefits from these systems have been largely tactical—the storage and analysis of large amounts of customer data. Even the newer, more advanced systems typically cannot adapt quickly to changes in the marketing needs of businesses because these systems are large, complex and proprietary in nature. As a result, these systems are generally customized for each client and may require significant recoding to implement changes in the way that the data is analyzed and used. Today's marketplace, however, demands marketing tools that have increased performance, scalability and flexibility.

More recently, in an attempt to improve flexibility and deliver more contemporary functionality, new marketing software has been implemented in a two tiered architecture (client/server). This two-tiered software, however, still mimics the past twenty years of software development with an occasional use of a "programming bus" to separate the interface and database logic layers. Most of these software components have static rather than dynamic functionality, which means that they have difficulty accommodating emerging variations in data types and inter-process control methods. These limitations are particularly problematic in the areas of modem market research, campaign management, media planning and execution. Moreover, these software components require frequent rewrites, which makes a "whole product" solution that can evolve quickly enough to keep pace with today's rapidly expanding marketing knowledge gap virtually impossible to deliver.

SUMMARY OF THE INVENTION

Other features and advantages of the present invention will be apparent to those of ordinary skill in the art upon reference to the following detailed description taken in conjunction with the accompanying drawings.

The present invention provides an apparatus for managing data having a first database for storing system data, a second database for storing client data and at least one database server to control the first database and the second database. In addition, a first set of objects is linked to the first database through the database server, and a second set of objects is linked to the second database through the database server. Moreover, an interactive manager is linked to the first set of objects and an external application, a set of minions is linked to the second set of objects, and an agent manager is linked to the job queue manager, the first set of objects and the set of minions.

The present invention also provides a computer program embodied on a computer-readable medium for managing data. The computer program has at least one code segment to control system data stored in a first database and client data stored in a second database and several code segments that define a first set of objects linked to the first database, a second set of objects linked to the second database, and one or more minions. There is also a code segment to provide an interface between an external application and the code segment to provide interaction with the one or more agent processes.

In addition, the present invention provides a database system having two or more computers communicably linked to each other through a network, a data storage tier resident on at least one of the computers, a user interface tier resident on at least one of the computers, and an object tier resident on at least one of the computers. The data storage tier has a first database for storing system data, a second database for storing client data and at least one database server to control the first database and the second database. The user interface tier has an external application. The object tier has a first set of objects linked to the first database through the database server, a second set of objects linked to the second database through the database server, an interactive manager resident on one of the computers in which the object tier is resident, a set of minions linked to the second set of objects, and an agent manager resident on each computer in which the object tier is resident, the agent manager linked to the job queue manager, the first set of objects and the set of minions. The interactive manager is linked to the first set of objects and the external application.

BRIEF DESCRIPTION OF THE DRAWINGS

The above and further advantages of the present invention may be better understood by referring to the following detailed description in conjunction with the accompanying drawings, in which.

DETAILED DESCRIPTION OF THE INVENTION

The present invention provides a system software architecture that supports a wide variety of hardware configurations. These configurations range from single machine, single database installations to large installations with multiple machines and databases. As a result, the present invention can be easily scaled up to meet added demand by increasing the number of machines and databases that participate in the system, and distributing agent processes to wherever it's most appropriate for the agent processor to run, e.g., closer to the data they manipulate.

Figure 1:
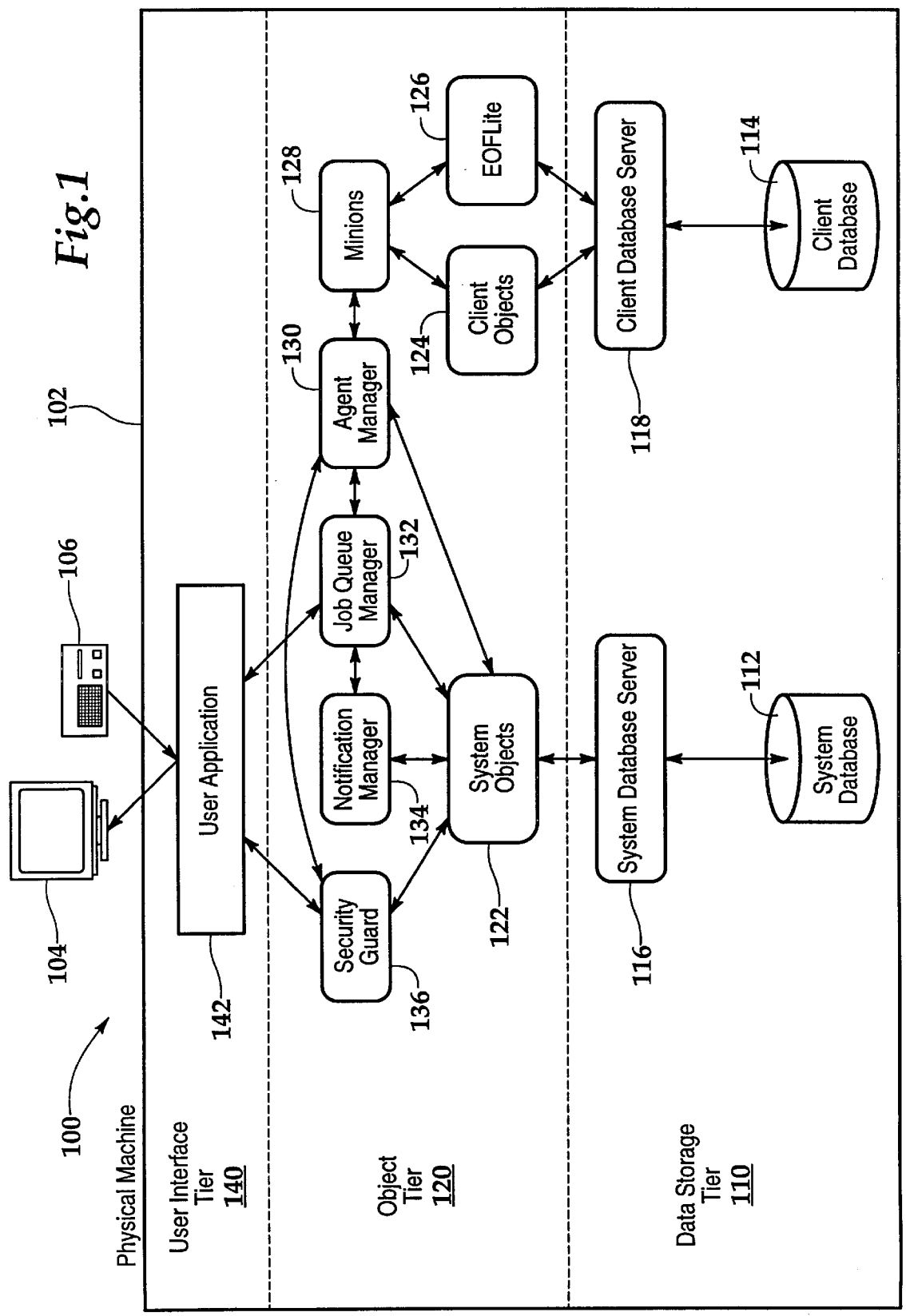
FIG. 1 is a block diagram of a single machine configuration in accordance with a preferred embodiment of the present invention.

Referring now to FIG. 1, a block diagram of a single machine configuration, in accordance with a preferred embodiment of the present invention, is designated generally by the numeral 100. The single machine configuration 100 includes a physical machine 102 connected to a display 104 and a keyboard 106. Regardless of the physical configuration, the present invention provides a system software architecture that is composed of three "logical" tiers 110, 120 and 140.

Figure 5:
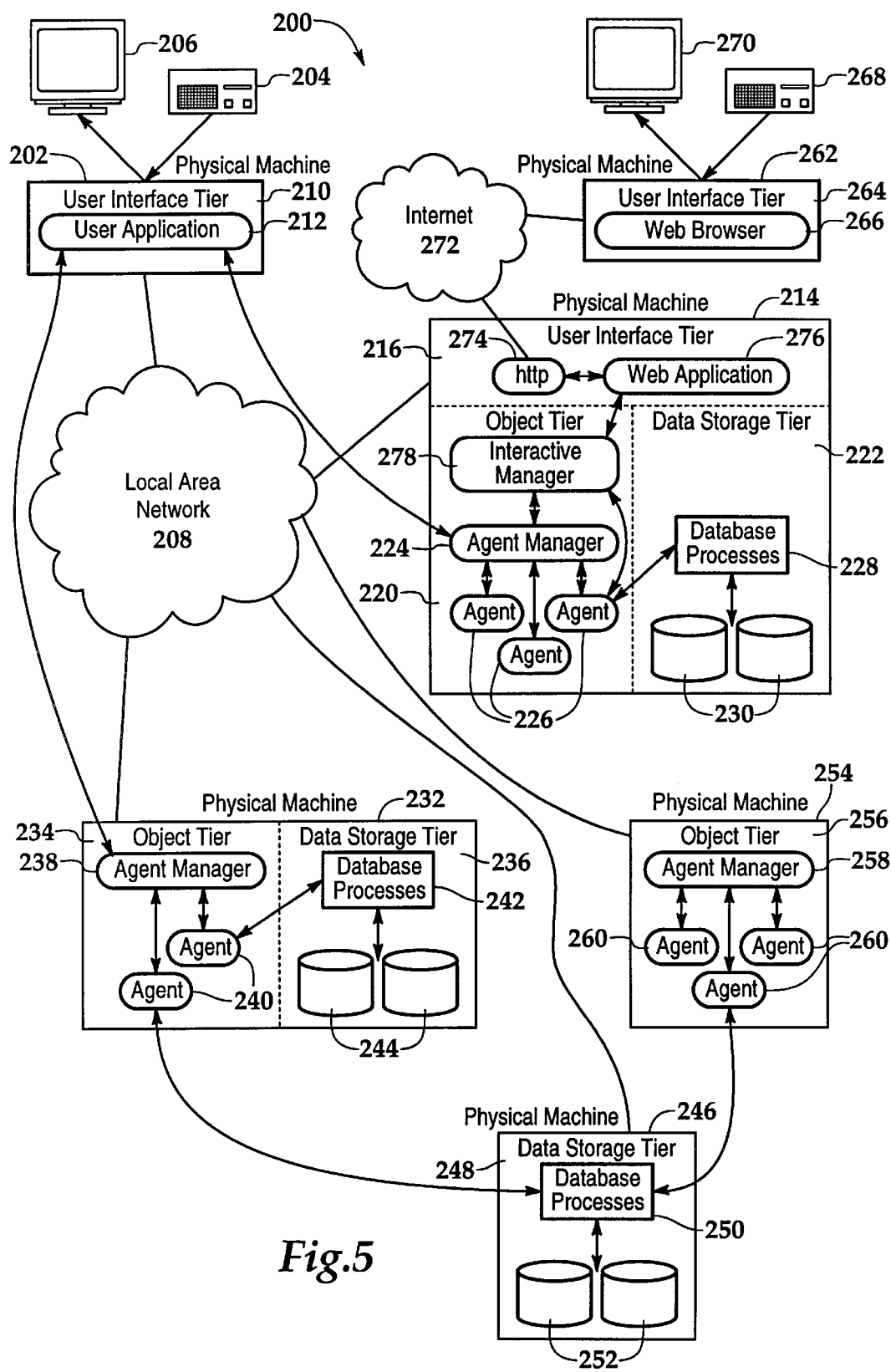
FIG. 5 is a block diagram of a multiple machine, multiple database configuration in accordance with a preferred embodiment of the present invention.

The first tier is the data storage tier 110, which handles persistent storage of information through one or more databases 112 and 114. The second tier is the object tier 120, which captures row data and converts row data from the data storage tier 110 to objects and then executes business rules against the objects. The third tier is the user interface tier 140, which presents raw and/or object data to the system user via the display 104 and receives commands and data from the system user via the keyboard 106. These three tiers 110, 120 and 140 are "logical" because they are not confined to a single machine or process. Accordingly and as illustrated in FIG. 5, each of the tiers 110, 120 or 140 may simultaneously span many physical machines and processes across one or more networks.

Within the data storage tier 110, one or more database processes can be executed concurrently by the system database server 116, which controls access to the system database 112, and/or the client database server 118, which controls access to the client database 114. The database servers 116 and 118 will typically be high-performance database servers, such as Informix or Oracle, that combine high-volume data storage and querying capabilities with network-transparent access. The flexibility of the current invention is increased by selecting database servers 116 and 118 that are capable of running on a variety of hardware platforms and are easily scalable from single-user installations with a small number of records up to large installations with many users and gigabyte databases. In addition, the database servers 116 and 118 may also be supported by a variety of front-end data access processes, analysis tools and applications. Alternatively, a single multiple-processor server hosting the two databases 112 and 114 may also be used.

The system database 112 includes tables for: user accounts; system security; session management; job management; media, file, and table tracking; billing; and sundry systems support. Whereas the client database 114 includes information such as: customer information; product descriptions; purchasing history; marketing campaign structure; promotion communications; reporting summary tables; and others on a per-client basis. Although two databases 112 and 114 are illustrated, the present invention can use as many as may be required.

The data storage tier 110 may include the following components, procedures, and processes: (1) database schema design and maintenance; (2) database creation and maintenance; (3) database disk layout and component distribution; (4) design and implementation of any required server-specific components (such as triggers and stored procedures); (5) the database server itself; (6) database network access; (7) data loading and unloading; and (8) database backups.

The object tier 120 is divided into two distinct subsystems: system objects and processes 122, which control system operation and administrative functions; and client objects and processes 124, which control all data operations on the marketing data. The system objects 122 are "persistent objects," which are usually stored in the system database 112 and are instances of classes for which a mapping is defined between the attributes of the class and columns in a database table. The values of the object attributes are stored in the database table through this mapping.

The object tier 120 may also include EOFLite components 126 to provide a "lightweight" binding layer for moving data back and forth between the client database 114 and minions 128 executing high-volume "batch processes." The EOFLite components 126 create instances of custom classes without having to live with the overhead inherent in the lower-level EOF frameworks, which are designed more for OLTP-type processing than for record-by-record batch processing.

Both the system objects 122 and the client objects 124 use persistent object classes to define specific business logic that is associated with the object attributes (and therefore implicitly with data from the databases 112 and 114 through the attribute-to-table-column mapping). Persistent objects can be instantiated from an arbitrary combination of database columns into "generic records," or can be instances of pre-defined classes containing attributes that are associated with particular columns in a table. Whether instances of generic records or instances of pre-defined classes are built is determined by the attribute-to-table mapping. In either case, the instances are created through a "database access layer," and made available to custom processes that can observe, manipulate, and save the instances back to the database.

The object tier 120 also contains minions 128, which provide services and sets of persistent objects to external client objects. In any given installation of the present invention, these objects can exist in both client-side end-user applications and in "interface-free" server-side applications called "agents." The agents exist to provide an executable wrapper around the minions 128. Thus, a particular agent can host an arbitrary combination of minions 128, and can be executed on any machine in a given installation of the present invention for which an executable has been built.

The minions 128 in these agent processes use the database access layer to convert database information between row form and persistent object form, and share these persistent objects with interface tier clients and/or other object tier clients. The minions 128 may also provide services that manipulate the objects locally and send the objects back to the database for storage. The minions 128 and persistent objects encapsulate business logic, and insulate the user applications 142 in the user interface tier 140 from data storage tier 110 dependencies. Minions 128 can exist in either remote agent processes or in the local address space of a client process. Client processes can also receive persistent objects directly from the database access layer.

There are two categories of minions 128 and persistent objects in the object tier 120. The first category consists of objects that oversee the control and administration functions of the present invention, such as the agent manager 130, job queue manager 132, notification manager 134, security guard 136, session management (not shown), and resource tracking and manipulation (not shown). The second category of objects imports, exports, reports on, cleans, maintains, and represents client data. All agent processes in the object tier 120 are controlled by a special minion called the "agent manager" 130. All access to remote agents and minions is granted through the agent manager 130.

The object tier 120 can be implemented using OpenStep object technology. This technology provides a database-independent framework for gathering information from local and/or remote database servers and converting it to object form. This technology also provides a relatively transparent object distribution mechanism that allows objects to communicate with each other across process and network boundaries as easily as if the objects coexisted in the same process. These key features directly support the ability for processes in the object tier 120 to execute on multiple physical machines.

The user interface tier 140 receives object data from the object tier 120, and controls the presentation of this data to the user. The user application 142 in the user interface tier 140 can operate in either two-tier or three-tier modes. User applications 142 that make direct connections to the database server to get data will be two-tier applications. User applications 142 that connect to agents in the object tier 120 to get data will be three-tier applications. It is possible for user applications 142 to directly include object tier classes and use them locally, operating in two-tier mode without actually bypassing the object tier 120. The user applications 142 may be implemented using native OpenStep applications, web-browser-based applications and applications built using technologies such as Microsoft Visual C++, which will communicate with the object tier via an object interface standard such as DCOM and CORBA. The user applications 142 may be local, remote, internal or external.

Figure 2:
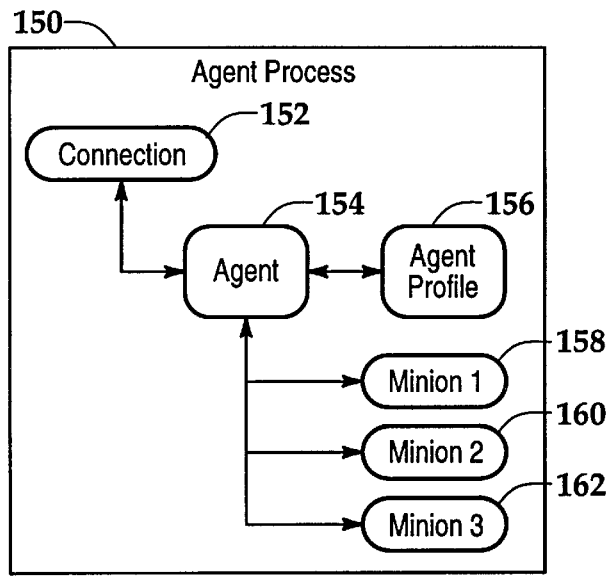
FIG. 2 illustrates the basic anatomy of an agent process in accordance with a preferred embodiment of the present invention.

Referring to FIG. 2, the basic anatomy of an agent process, in accordance with a preferred embodiment of the present invention, is designated generally by the numeral 150. The agent process 150 comprises a connection 152, an agent 154, an agent profile 156 and one or more minions 158, 160 and 162. As described above, the processes running in the object tier 120 are called agents 154, which are generic, independently executable programs that can run on any machine in the system. The sole purpose of an agent 154 is to serve as a distribution and control mechanism for an arbitrary combination of named class instances called minions 158, 160 and 162. The minions 158, 160 and 162 are objects that provide services and sets of persistent objects to external client objects through interfaces called minion formal protocols. There is a separate protocol defined for each possible minion class that needs to communicate across the network. Protocols are not classes, and are therefore never instantiated or stored in a database.

Agents 154 do not inherently depend on the minions. During startup, an agent 154 extracts agent profile information 156 from a configuration file using a name given to it on the command line as a lookup key. The agent profile 156 specifies the minions 158, 160 and 162 that the agent 154 will manage, and any additional code that the agent 154 must load to support those objects. The agent process 150 configures itself dynamically based on the agent profile 156.

To support maximum flexibility on how systems can be configured, no restrictions are placed on where an agent 154 can execute (in other words, an agent 154 can be launched on any machine for which an agent executable has been built). This permits the logical object tier 120 to span the network across various physical machines concurrently. In practice, if agent 154 and/or the minions 158, 160 and 162 managed by the agent 154 depend on resources on a particular machine, the agent 154 should be configured to execute on that machine to keep those resources "local." External clients may gain access to the agent 154 via the connection 152, which is registered under a unique name given on the command line when the agent process 150 is launched.

There can be an arbitrary number of agents 154 executing at any given time on a particular machine. In practice, the total number of agents 154 that can be simultaneously executing is limited based on the types of minions 158, 160 and 162 they are hosting. For example, if an agent 154 is hosting a very resource-intensive minion (such as one that will perform a bulk address-correction job) the total number that can run simultaneously may be limited to something very small. These limits are specified in the system configuration file of the present invention.

Figure 3:
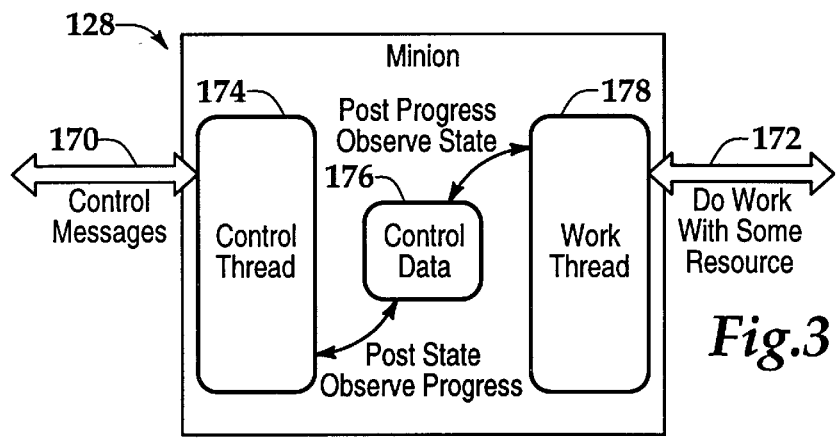
FIG. 3 illustrates the basic anatomy of a minion in accordance with a preferred embodiment of the present invention.

Now referring to FIG. 3, the basic anatomy of a minion 128, in accordance with a preferred embodiment of the present invention, is described. Minions 128 are multi-threaded because the minions 128 have to respond to control messages 170 while the minions 128 are doing work with some resource 172. Once a time-consuming process has been started in a minion 128 (such as a batch database update of a large number of records), the minion 128 should still be able to pause, resume, or stop the process on command. "Pausing" temporarily halts an operation without losing its state. "Resuming" allows an operation to continue from the point at which it was most recently paused. "Stopping" an operation causes it to be abandoned by its controlling minion, and returns that minion to an idle state.

The minion 128 has a control thread 174 that services these control messages 170 as they arrive from external sources, and updates information in the control data block 176. It is up to the work thread 178 to monitor the control data block 176 and perform the correct function based on the data contained therein. For example, a responsible work thread 178 will check the control data block 176 every pass through its processing loop, and either pause, resume, or stop processing based on the values in the control data block 176. When the work thread 178 discovers an instruction to stop processing, the work thread 178 will release any resources allocated to the work thread 178 for the job, then exit the thread.

The minion 128 should also provide progress reports during time-consuming operations. The work thread 178 periodically updates the progress of the minion 128, which is stored in the control data block 176. These reports include a description of the operation, the estimated percentage of the operation that has been completed, the number of records processed, and the estimated completion time. These progress reports are available through direct request from the minion 128 via the control thread 174.

Figure 4:
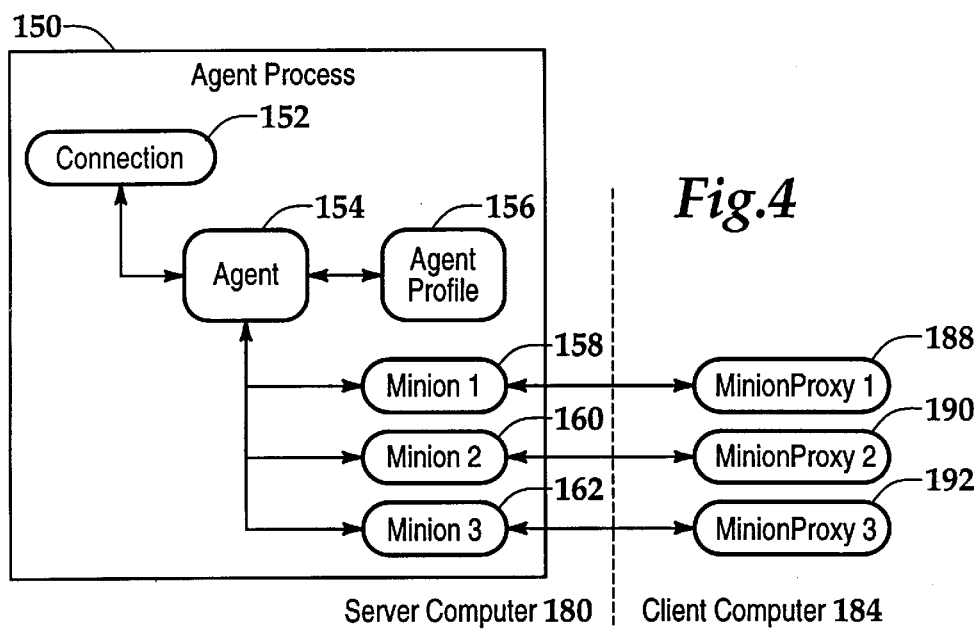
FIG. 4 illustrates minions and minion proxies in accordance with a preferred embodiment of the present invention.

Now referring to FIG. 4, minions and minion proxies, in accordance with a preferred embodiment of the present invention, are described. Minions 158, 160 and 162 within agent process 150 on server computer 180 communicate with client processes 182 on client computer 184 using minion proxies 188, 190 and 192, respectively. Minion proxies 188, 190 and 192 are the client-side 184 counterparts to server-side 180 minions 158, 160 and 162. The minion proxies 188, 190 and 192 conform to the same protocols and allow transparent remote communication with minions 158, 160 and 162. Minions 158, 160 and 162 can be created directly within a client process 182 address space, coexisting with other local minions and/or minion proxies 188, 190 and 192. Minions 158, 160 and 162 are never stored persistently (i.e. they do not have a representation in any database).

The minion interfaces are defined in this way to make local minion instances and local minion proxy instances 188, 190 and 192 have the same apparent interface. The proxy classes provide a convenient place to perform client-side caching, a level of indirection through which to handle disconnection/reconnection with remote minions, and a class on the client side that can be associated with formal protocols. It also makes remote minions relatively transparent to developers. Client processes 182 that choose to use minions 158, 160 and 162 directly in their local address space operate in "two-tier" mode. Client processes 182 that choose to use minion proxies 188, 190 and 192 in their local address space operate in "three-tier" mode. In either event, the client processes 182 will be able to send the same messages to either type of object.

"Formal Protocols" define formal interfaces that are independent of any particular class. A protocol has a unique name, and declares a set of messages that can be implemented by any class. A particular class "conforms" to one or more protocols if it guarantees that it implements every message declared in each of the protocols. The interface to the minion classes is defined entirely in terms of formal protocols. A given minion class and its corresponding minion proxy class will both conform to the same formal protocol. A unique formal protocol is defined for every minion subclass.

Minion classes, minion proxy classes, and formal protocols are uniquely named to coexist in the same address space without interfering with each other. Client processes 182 can then simultaneously perform some operations in "two-tier" mode and others in "three-tier" mode depending on whichever is more appropriate.

Although single-machine configurations, such as 100, are possible, typical configurations will include multiple machines, multiple databases, and multiple users. Now referring to FIG. 5, a block diagram of a multiple machine, multiple database configuration in accordance with a preferred embodiment of the present invention is designated generally by the numeral 200.

Physical machine 202, having a keyboard 204, a monitor 206, a user interface tier 210 and a user application 212, is connected to a local area network 208. Physical machine 214, having a user interface tier 216, an object tier 220 and a data storage tier 222, is also connected to the network 208. The user application 212 of physical machine 202 is shown communicating with the agent manager 224 in the object tier 220 of physical machine 214. The agent manager 224 in turn communicates with agents 226, which communicate with database processes 228 and databases 230 in data storage tier 222.

Physical machine 232, having an object tier 234 and a data storage tier 236, is also connected to the network 208. The user application 212 of physical machine 202 is shown communicating with the agent manager 238 in the object tier 234 of physical machine 232. The agent manager 238 in turn communicates with agents 240, which communicate with database processes 242 and databases 244 in data storage tier 236. The agents 240 of physical machine 232 are also shown communicating with the data storage tier 248, database processes 250 and databases 252 of physical machine 246 via the local area network 208.

Physical machine 254, having an object tier 256, is also connected to the network 208. The agent manager 258 and agents 260 of physical machine 254 are shown communicating with the database processes 242 of physical machine 232 and the database processes 250 of physical machine 246 via the local area network 208.

Physical machine 262, having a keyboard 268, a monitor 270, a user interface tier 264 and a web browser 266, is connected to the Internet 272. Physical machine 214 is also connected to the Internet 272 using http 274 and a web application 276 within the user interface tier 216. The web application 276 then communicates with the interactive manager 278, which in turn communicates with the agent manager 224 and agents 226. In addition, users may access any of the components of the system remotely via a dial-up line or web interface.

Agents and Minions

Now referring back to FIG. 1, various agents and their associated minions will be described in more detail. Agents serve as executable wrappers around an arbitrary combination of minions. The only thing that makes one agent different from another is the kind of minions that each agent is hosting. Because the customization of an agent takes place by changing the minions that it hosts, there is only one kind of agent executable from which all executing agents are launched. Agents can be configured to run continuously, run on demand or run on a regular schedule.

The present invention has six system agents that run continuously: the agent manager 130 (AgentManagerAgent), the job queue manager 132

(JobQueueManagerAgent), the notification manager 134, which includes the NotificationCenterAgent and the NotificationDispatcherAgent, the security guard 136 (SecurityGuardAgent), and the interactive manager 278, which includes the ServerLookupAgent and the InteractiveServerAgent.

A single agent manager 130 is started at boot-up on each machine that participates in the present invention. The remaining agents in this group are started by the agent manager 130 during its start-up phase. These agents run continuously until the agents are either explicitly shut down by a system administrator, or the system on which the agents are running goes down. The agent manager 130 hosts the AgentManagerMinion, which controls connections to, and the lifetimes of, all other agents on the host computer where the agent manager 130 is running. The agent manager 130 also manages connections to all other minions on that machine.

For example, each minion has a name that is used by a client process to request a connection to a specific minion through the agent manager 130. When the agent manager 130 is asked for connection information to a named minion, it performs the following steps: (1) consults the cross-reference to determine the generic name of the agent(s) that would be hosting that object; (2) examines all idle running agents with that generic name (if any), and determines if any of them report that their minion of the requested name is idle; (3) if any such agents are found, their connection information is loaded into an agent ticket and returned to the client; (4) if no agents with that generic name are running, the agent manager will simply start one and use it in the returned agent ticket; (5) if there are running agents with that generic name but none of them are idle, the agent manager will consult the present invention's system configuration file to determine how many agents with that generic name can be running simultaneously, and start a new one if limits permit; and (6) if all of that fails, no connection information is returned to the client (the client must be prepared to handle a connection refusal).

Client processes that need to connect to a particular agent (or to some named minion running in a particular agent) will go through the agent manager 130 to get the information necessary to make the connection. This connection information is vended in the form of "agent tickets" (for connection to the agent itself) and "object tickets" (for connection to a minion), which can be "redeemed" by client objects to gain direct connections to remote agents and minions. Client processes must always get their connection information in "ticket" form through the agent manager 130. This is because the agent manager 130 will usually be controlling more than one instance of an agent with a particular generic name, each of which will be registered with the object distribution mechanism under a unique name that is only known to the agent manager 130 and the agent itself. The single exception to this is for connections to the AgentManagerAgent, which will always register under the name "AgentManagerAgent".

The agents managed by an agent manager 130 on a particular host machine are described by the "agent profiles" for that machine, which are obtained from the system configuration file. The information in the agent profile provides the agent manager with information it uses to control agent execution, such as which executable programs to run to launch an agent, whether or not an agent requires a "context" to launch, how many agents of a given type may be simultaneously executing, and how long to wait before killing an idle agent. When the agent manager 130 loads the agent profiles from the system configuration file, the agent manager 130 builds a cross-reference of which agent processes are hosting minions based on the names under which the minions are registered.

Agent processes are launched and killed exclusively by the AgentManagerMinion. Agent processes may be killed on request from an external client (such as an agent monitoring application), or automatically by the agent manager 130 because they have been idle for a certain period of time and no longer need to be using system resources. An agent is considered "idle" if all minions that it manages report that they are idle. Agents that are frequently used are configured to remain idle for some period of time so if a request comes to the agent manager 130 to start up that agent, the agent manager 130 can just use the idle agent rather than have to launch another one. This is particularly important for agents that take a long time to launch.

The job queue manager 132 hosts the JobQueueManagerMinion, which manages manipulation of job streams in the job queue, and manages execution of the component job configurations in the job streams. The JobQueueManagerMinion monitors the job queue for job streams that need to run, controls execution of the job configurations in a job stream, observes notification of job configuration completion, and passes billing information to the billing manager for completed jobs. To provide job stream execution services, the job queue manager 132 periodically examines entries in the job queue and schedules the queue entries for execution.

Each job queue entry is composed of a "stream" of component job configurations scheduled to run at a given day and time with a particular priority. Job streams have optional dependencies on completion of other jobs streams in the queue (e.g. job stream "B" cannot run until job stream "A" has completed successfully). The job configurations in a stream can also have dependencies between them (e.g. job configuration "B" cannot run until job configuration "A" has completed successfully). Each job configuration specifies a particular set of commands that are to be executed by some agent process, along with the input and output parameters for that process. The JobQueueManagerMinion manages the execution order of these job streams and job configurations based on the dependencies between them, and monitors the system for job configuration completion. Processing information for successfully completed job configurations is passed to the billing manager where billing records are queued for posting to the central accounting system. Only one job queue manager 132 will run in a given system of the present invention.

The notification manager 134 includes the NotificationCenterAgent and the NotificationDispatcherAgent. The NotificationCenterAgent hosts the NotificationCenterMinion, which serves as a central hub for distribution of advisory messages to interested observers. The NotificationDispatcherAgent hosts the NotificationDispatcherMinion, which packages and routes notifications to interested users via e-mail and/or pagers.

The NotificationCenterMinion serves as a central hub for routing advisory notifications from objects that "post" the notifications, to an arbitrary number of objects that register as "observers" of the notifications. Each advisory message has a name, and is associated with an object and a set of supplementary "user information." The names of the notifications are determined by the posting objects, and have to be known to observers so they can register as observers of the notifications. The object and "user information" associated with the notifications are also determined by the posting object, and can be whatever is deemed important for any particular advisory notification. Only one notification center will run in a given system of the present invention.

The NotificationDispatcherMinion packages notifications and routes them to users using user-specified transport mechanisms, including e-mail and pagers. Each system user can register to be sent an arbitrary set of notifications via any of the available mechanisms. Only one notification dispatcher will run in a given system of the present invention.

The security guard 136 hosts the SecurityGuardMinion, which is the first line of defense in the object tier for protecting the system against unauthorized access. The SecurityGuardMinion determines the validity of a given userID and password combination, and determines if a user has permission to perform a specific action. All guarded operations will obtain permission from the security guard before proceeding. The security guard 136 will always run in a stand-alone process so that it can be given special privileges if necessary. The security guard 136 thus prevents users from: (1) intentionally and/or unintentionally manipulating data without proper authorization; (2) reading data without proper authorization; and (3) making invalid changes to data whether authorized or not.

Due to the importance of the data contained within the databases and the efforts expended to obtain that data, the database must be protected against unauthorized access, yet still allow the present invention to perform tasks on behalf of those same users. Security becomes more difficult in the multiple machine, multiple database architecture of the present invention because a user can connect to a database in a variety of ways: (1) directly from a present invention front-end process; (2) indirectly from an object-tier process to the present invention; (3) directly on the server via an SQL tool such as Informix DBaccess or Oracle SQLplus; and (4) directly from an arbitrary front-end development tool (such as VisualFoxPro) via ODBC.

Current database systems only choose security privileges based on whom the user is and do not discriminate based on how the user is connected because most external tools share a common interface to the database (i.e., the database doesn't know how a user is connected, just that there is a connection from somewhere). The database, therefore, cannot be used to effectively enforce the desired level of security. Accordingly, the present invention uses an application-enforced security wherein: (1) users will each have a single user name on the system(s) hosting the present invention; (2) database privileges based on these user names will be very tightly restricted and controlled; and (3) only selected users will have any privileges on the tables (this protects the database against access via tools such as SQLplus or an arbitrary front-end process connecting via ODBC).

In the present invention, processes connect to the system using an application ID that is chosen for the processes ahead of time. In addition, the processes are granted only the maximum set of privileges necessary to perform the task(s). The set of "actions" that a user can attempt to perform against the database is stored in tables that become part of the user's "security profile." The present invention restricts the tasks the processes can perform based on the security profile of the user on whose behalf they are operating (application enforced security).

The interactive manager 278 includes the ServerLookupAgent and the InteractiveServerAgent. The ServerLookupAgent and InteractiveServerAgent allow multiple external applications to simultaneously connect with any client within the system. Any client in the system that desires to support this interactive interface will run an instance of the InteractiveServerAgent. Each client will also run Agent instances for the various interactive functions it wishes to provide. Note that the client does not have to provide all possible functions or services. Accordingly, the set of processing Agents that are available are defined in the client's configuration file. Moreover, each agent participating in the interactive interface is designed to handle many requests from any external application.

When the ServerLookupAgent is started by the agent manager 130, the ServerLookupAgent pulls in its archived persistent list of known connection records. The ServerLookupAgent is unaware of the circumstances under which it is being started (crash, normal shutdown, etc.), so it assumes the worst has occurred. For every record found in its archived persistent list, if any, the ServerLookupAgent "pings" each InteractiveServerAgent, via distributed objects, to verify that the InteractiveServerAgent is still running.

The ServerLookupAgent uses this process to query the agent manager 130 for a valid "ticket" to communicate with the needed InteractiveServerAgents. Once the ticket is acquired, the ServerLookupAgent "redeems" the ticket to verify the presence of the needed processing agent. If the processing agent does not exist, the record in the ServerLookupAgent is removed for that minion. This process handles the situation where multiple processing agents have "died" unexpectedly. Note that the process described above typically occurs when either the ServerLookupAgent or a processing agent has unexpectedly died.

The agent manager 130 also starts the InteractiveServerAgent. The InteractiveServerAgent sends a "ticket" request to the agent manager 130 to "speak" with a specific processing agent. The agent manager 130 gets the requested processing agent ready to "speak" with the InteractiveServerAgent and then sends the ticket to the InteractiveServerAgent. The InteractiveServerAgent redeems the ticket and begins to "speak" directly with the requested processing agent using distributed objects. The InteractiveServerAgent also communicates with the external applications via IP addresses and port numbers.

There are five system agents that run on demand: CommandLineAgent, FileManagerAgent, FileTransferManagerAgent, MediaDataTransferManagerAgent, and the RoboDBAAgent. These agents are started by the agent manager 130 upon a request from an external client processes. The agent manager 130 may limit the total number that can be executing at any given time to balance system load.

The CommandLineAgent hosts the CommandLineMinion, which provides a wrapper around execution of system command line commands that can be messaged and scheduled for asynchronous execution. The CommandLineMinion provides a capability similar to that provided by the "system" call commonly available in "C" language programming environments. The CommandLineMinion can be remotely messaged and scheduled for deferred execution.

The FileManagerAgent hosts the FileManagerMinion, which provides basic file system interrogation and manipulation services on local or remote machines, including: checking for existence of a file; reporting on file size; reporting on file access permissions; creating a file; and deleting a file. The FileManagerMinion can be embedded in an agent process and scheduled for deferred execution by the job management system. In addition, the FileManagerMinion can manipulate and return information about files that are not on the local machine.

The FileTransferManagerAgent hosts the FileTransferManagerMinion, which controls the movement of files between source and destination file system locations. The FileTransferManagerMinion provides services for: transferring files between locations on the same machine; transferring files between locations on different machines; and moving files between projects. These services are similar to those provided by the "ftp" command-line utility. The FileTransferManagerMinion can be embedded in an agent process and scheduled for deferred execution by the job management system.

The MediaDataTransferManagerAgent hosts the MediaDataTransferManagerMinion, which controls movement of data between incoming physical media (e.g. tapes, disks) and the file system. This minion provides similar services to those services provided by the FileTransferManagerMinion.

The RoboDBAAgent hosts the RoboDBAMinion, which controls manipulation of database objects. The RoboDBAMinion provides services for: creating and dropping tables; creating and dropping indexes; unloading table schemas; and loading and unloading table data. The RoboDBAMinion can be embedded in an agent process and scheduled for deferred execution by the job management system. The RoboDBAMinion can also be given special database privileges that are not provided to any other process is because the minion can run in a separate agent process. The only kinds of database tables that will be created through this minion are temporary database tables called "project tables" that provide work areas while processing the data for particular projects. Client production tables will always be created by external scripts when setting up the present invention for new clients.

There are four system agents that are regularly scheduled: ArchiverAgent, CustodianAgent, DiskUsageBillingAgent, and the MatterNumberImportAgent. These agents are started by the job queue manager 132 on regularly scheduled intervals. The agents and the intervals are specified in an external system file.

The ArchiverAgent hosts the ArchiverMinion, which supports the client and project multi-step archiving procedure. The ArchiverMinion will be configurable from the command line to perform a variety of archiving tasks, each of which may be scheduled with the job management system to run at regular intervals that vary with the type of archiving functions being performed. The archiving process may require operator intervention because physical media such as tapes and disks must generally be moved between racks and drives. The archiving procedure consists of the following general steps: unloading relevant data from the database; updating selected tables to reflect that the client or project has been archived; notifying operators to move data to tape; and removing archived files.

The CustodianAgent hosts the CustodianMinion, which performs general clean-up tasks in the system. The CustodianMinion will be configurable from the command line to perform a variety of cleaning tasks, each of which may be scheduled on regular intervals, such as cleaning temporary files and data tables, physical media that have passed their expiration dates, "orphaned" user application sessions that might be lingering in the database because of an abnormal process termination, and others as the system grows. CustodianAgents are typically scheduled with the job management system to run at intervals that vary with the type of clean-up functions being performed.

The DiskUsageBillingAgent hosts the DiskUsageBillingMinion, which examines the amount of disk usage for each active client on the system, and computes appropriate billing entries. The DiskUsageBillingMinion examines the file system and computes the amount of disk space occupied by the files and database tables associated with various clients. The DiskUsageBillingMinion then creates billing table entries for each client based on the amount of disk space they are using. Note that billing table entries for scheduled batch jobs are created by the job queue manager 132 when it is notified that a job configuration has successfully completed processing. DiskUsageBillingAgents are typically scheduled in the job management system to run once per week.

The MatterNumberImportAgent hosts the MatterNumberImportMinion, which moves matter number information from the central accounting system into the system tables. The MatterNumberImportMinion reads matter number information from tables in the central billing system, and merges new and modified records into the matter number tables of the present invention. MatterNumberImportAgents are typically scheduled in the job management system to run either once per day or once per week.

The SessionManagerAgent hosts the SessionManagerMinion, which establishes sessions for system users and makes sure no more than one session is in effect at any given time for a user on a particular workstation. The SessionManagerMinion also ensures that sessions are persistently tracked in the database.

System minions can run locally or run remotely in an agent process. It is, however, desirable to minimize the number of minions that run in remote processes to reduce complexity in the implementation, and to minimize the number of separate database connections in effect at any given point in time because licenses for database connections are expensive to buy. Accordingly, the LibrarianMinion and the EventLogMinion are combined into a central library that will be loaded locally by all processes needing their services.

The LibrarianMinion handles creation and tracking of all external physical media and files used by the present invention. Each of these items is tracked as it enters and exits the system. External physical media enter the system in the form of tapes and disks sent in by clients. Files (such as reports and error logs) are generally created as a side-effect of system processes. Files also enter the system in the form of externally created documents, such as word processor documents and spreadsheets.

The EventLogMinion provides a central point of access for all advisory messages that need to be stored persistently in the database. The "events" in the log are descriptions of some event in time, such as the observed failure of a critical component, or the failure of a job stream to complete. The events stored in the log describe unusual conditions that require the attention of a user or system operator. Initial deployments of the present invention will include an event log object as a simple local convenience object in each application that needs to access the log, rather than have a single central event log that runs in a remote agent.

System Objects

Figure 6:
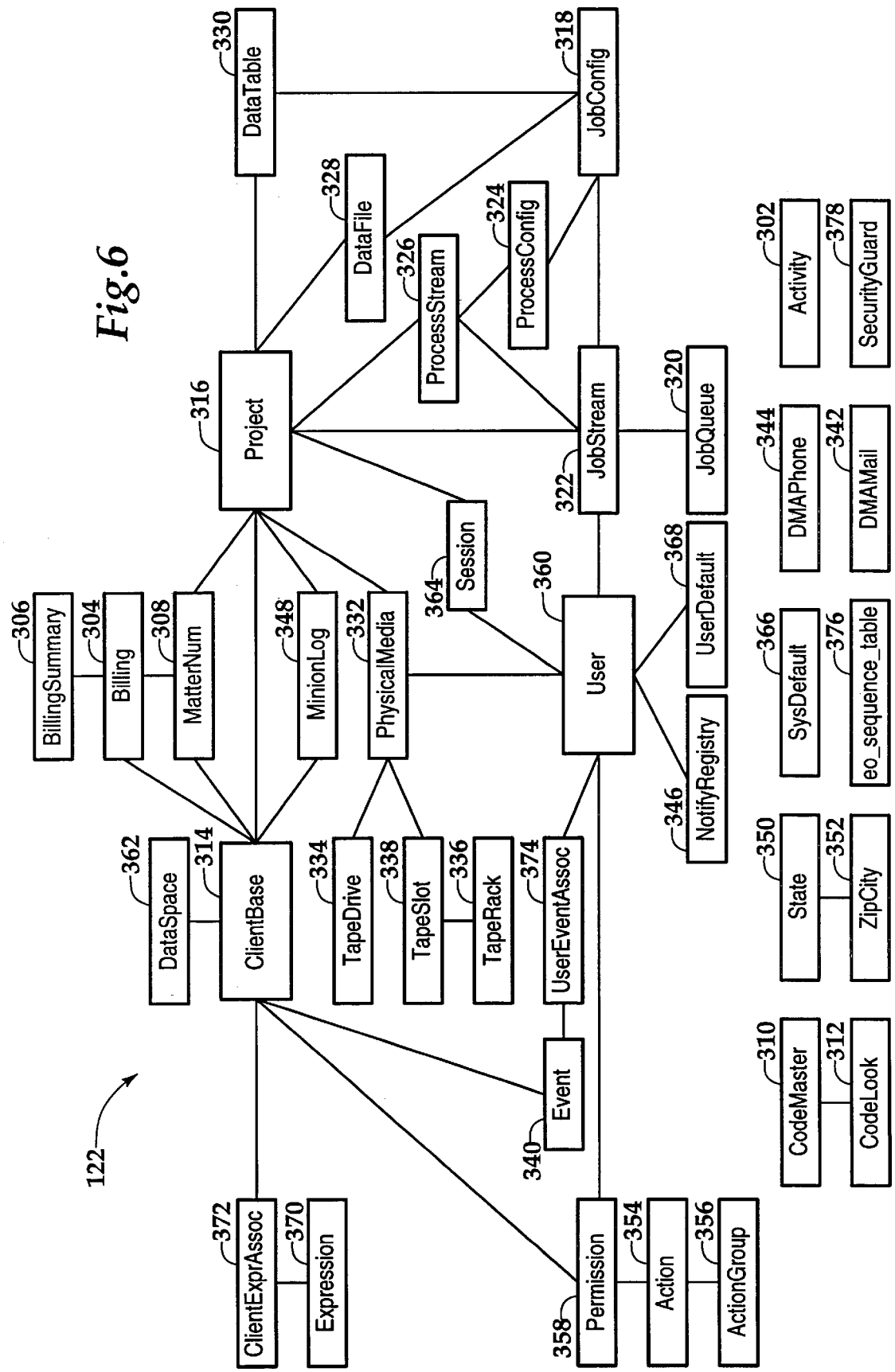
FIG. 6 is a block diagram of the persistent objects comprising the system objects 122 (FIG. 1) in accordance with one possible relational embodiment of the present invention.

Now referring to FIG. 6, a block diagram of the persistent objects comprising the system objects 122 (FIG. 1), in accordance with one possible relational embodiment of the present invention, is illustrated. The present invention is not limited to the specific system objects 122 described or to the relational embodiment illustrated in FIG. 6. Those persons skilled in the art will recognize that the present invention is designed to allow system objects 122 to be added, deleted or changed, and the relationships between the system objects 122 to be changed according to the intended application of the present invention. The relational nature of the system objects 122 allow the present invention to be modified without extensive recoding.

The system objects 122 comprise a number of interrelated persistent objects that are the object tier representation of rows in database tables. The persistent objects are grouped according to the minions that are primarily responsible for manipulating them.

Billing Persistent Objects

Activity objects 302 associate an accounting activity code with a description. In this regard these objects are very similar to the CodeMaster 310 and CodeLook 312 objects. Activity objects 302 are a separate class because they are closely associated with the accounting department, and are updated periodically with data obtained from the accounting system. The CodeMaster 310 and CodeLook 312 objects are relatively static and are associated exclusively with the present invention.

Billing objects 304 contain transaction information that is used to bill clients for services provided on their behalf. Billing objects 304 include such information as: an account number to bill against; tracking information about when the transaction occurred and when it was posted to the accounting department; a description of the services being billed; and billing units and amounts. Clients are billed for both processing storage and disk space usage. Billing objects 304 for processing are created at the end of process execution, whereas Billing objects 304 for disk storage are created on weekly intervals by the DiskUsageBillingAgent. A given Billing object 304 is associated with one MatterNum 308 and ClientBase 314 object.

BillingSummary objects 306 represent Billing objects 304 summarized over some period of time by client, project, matter number, and accounting activity code. These objects are created periodically by the BillingManagerMinion. Summarizing Billing objects 304 into BillingSummary objects 306 provides the accounting department with the minimum set of items needed to perform the required billing functions.

MatterNum objects 308 contain billing information and activity status for a particular ClientBase object 314. Typically, a ClientBase object 314 has a matter number for disk storage billing and a matter number for data processing billing. Project objects 316 also have a matter number for disk storage billing and a matter number for data processing billing. When a new Project object 316 is created for a given ClientBase object 314, the matter numbers for the single ClientBase object 314 are copied and associated with the new Project object 316. The matter numbers for the Project object 316 may be changed at any time after the Project object 316 is first created. Billing records are associated with one matter number.

Job Management Persistent Objects

A JobConfig object 318 is a description of a process to be executed that may include a text description of the job configuration; an identifier associating it with the process configuration object that was used to create the job configuration; the name of the agent to run; command line arguments to send to the agent when it is launched; the messages the agent must process; a description of any dependencies on other job configuration objects; tracking information about when the job configuration started and ended processing; and result information about the volume of records processed and success or failure of processing. A JobConfig object 318 is associated with one JobStream object 322 and one ProcessConfig object 324.

A JobQueue object 320 associates a single JobStream object 322 with a date, time, and priority at which to run, and context information to use during execution. Once a JobQueue object 320 has been saved in the database, it can be modified or deleted. Deleting the JobQueue 320 entry removes the associated JobStream 322 and JobConfig 318 objects from the database. Modifications that can be made to the JobQueue object 320 include changing the date, time or priority.

A JobStream object 322 associates a group of JobConfig objects 318 together into a stream, where the JobConfig objects 318 can have dependencies between them. A JobStream object 322 is associated with one or more JobConfig objects 318 and may include information such as a text description of the job stream, information about dependencies on other job streams, tracking information about when the job stream started and ended execution, control information about expected execution times, and job stream completion status information.

A ProcessConfig object 324 is a "template" from which JobConfig objects 318 are created. When a system user of the present invention wants to submit a new JobConfig object 318 to the system, an existing ProcessConfig object 324 can be used as a template, or a new ProcessConfig object 324 can be created. In either case the ProcessConfig object 324 is saved back to the database. ProcessConfig objects 324 are essentially JobConfig objects 318 without the dynamic attributes, but may include such information as a text description of the process configuration, the name of the agent to run, command line arguments to send to the agent when it is launched, the messages the agent must process, and a description of any dependencies on other job configuration objects. A ProcessConfig object 324 is associated with one ProcessStream object 326. A ProcessStream object 326 and its associated ProcessConfig objects 324 never become part of the job queue. Instead, when a user submits a JobStream object 322 to the job queue for execution, the ProcessStream 326 and ProcessConfig 324 objects are used to create JobStream 322 and JobConfig 318 objects; those are the objects actually submitted to the queue.

A ProcessStream object 326 is a "template" from which JobStream objects 322 are created. When a system user wants to submit a new JobStream object 322 to the system, an existing ProcessStream object 326 can be used as a template, or a new ProcessStream object 326 can be created. In either case, the ProcessStream object 326 is saved back to the database. ProcessStream objects 326 are essentially JobStream objects 322 without the dynamic attributes, but may include such information as a text description of the job stream, and information about dependencies on other job streams.

Media Processing And Tracking Persistent Objects

A CartridgeTape object (not shown) differs from basic Tapes in that it has compression and track count information associated with it. A given CartridgeTape object can be associated with one ClientBase object 314 (but a given ClientBase object 314 may be associated with many CartridgeTape objects, or more generally, with many other PhysicalMedia objects 332).

DataFile objects 328 represent tracked data files in the system and may include files imported from external media, files created as a side-effect of a system or client process, files extracted from a database, and files created outside the system (such as a word processor document) that have been entered into the system by a user for tracking purposes. The DataFile object 328 records sundry information of interest about the file. A given DataFile object 328 is associated with one Project object 316. The lifetime of a DataFile object 328 is specified by the Project object 316 it is associated with.

DataTable objects 330 represent tracked database tables in the system. The database tier contains both "production" tables (i.e. tables whose formats are fixed for a given client), and "project" tables that are created as a side-effect of processing the client data. The DataTable object 330 records sundry information of interest about the table. A given DataTable object 330 is associated with one Project object 316. The lifetime of a DataTable object 330 is specified by the Project object 316 it is associated with.

NineTrackTape objects (not shown) represent single-reel, nine-track tapes, that are usually associated with mainframe computers. NineTrackTape objects differ from basic Tapes in that they have tape density information associated with them. A given NineTrackTape object can be associated with one ClientBase object 314 (but a given ClientBase object 314 may be associated with many NineTrackTape objects, or more generally, with many other PhysicalMedia objects 332).

A PhysicalMedia object 332 describes the common attributes of physical media used for transporting data (such as magnetic tapes). These common attributes include not only characteristics of the physical media itself (such as its volume label), but also sundry information such as where it is physically located, when it was received, general comments, etc. A particular ClientBase object 314 can be associated with many PhysicalMedia objects 332 (but each of those can only be associated with a single ClientBase object 314). All PhysicalMedia objects 332 are cataloged by the Librarian so they can be tracked. PhysicalMedia objects 332 almost always have a finite lifetime, after which they are disposed of in some manner that is determined at the time they are cataloged. The lifetime of a PhysicalMedia object 332 is determined by the Project object 316 it is associated with.

A Tape object (not shown) represents any kind of magnetic tape media such as CartridgeTapes and NineTrackTapes. A Tape object can be thought of as an abstraction that collects common attributes shared by all tape objects. A TapeDrive object 334 represents tape drives in which magnetic tapes can be read and written. A TapeRack object 336 represents the racks in which magnetic tapes are stored. A TapeSlot object 338 represents a slot in a tape rack.

Miscellaneous Persistent Objects

An Event object 340 represents an event that happened on the system that needs to be stored persistently in the event log database table. Event objects 340 describe what happened, when it happened, what operation or process was being performed at the time the event occurred, and some notion of severity (although severity is hard to convey because it is usually a function of who is observing the event). Because Event objects 340 are associated with processes, they are implicitly associated with a particular ClientBase object 314 unless the Context under which the process was operating did not include a ClientBase object 314 (which is the case for processes operating on behalf of the present invention itself). UserEventAssoc objects 374 contain the Event objects 340 that each User object 360 is interested in.

A CodeLook object 312 provides a long description for a given "code" (i.e. a short single word description or mnemonic), and associates the code with a CodeMaster object 310. All codes used in the system are stored in a single CodeLook table in the database. The codes that are grouped together are associated with the same CodeMaster object 310.

A CodeMaster object 310 describes the different codes that are used by the system. This description includes the name of the table column associated with the code, a long description for the code, the length of the code, and whether or not new codes can be added to the list of codes associated with this code master. The possible code values for a given CodeMaster object 310 are stored in the CodeLook table, and are associated with the CodeMaster object 310 through its unique identifier.

DMAMail objects 342 represent customers who do not want to receive promotion pieces from a mail marketing campaign. DMAPhone objects 344 represent customers who do not want to be contacted by phone on behalf of a telemarketing campaign.

A NotifyRegistry object 346 associates a notification name with a user who wants to have an e-mail and/or pager message sent to them when the notification occurs. NotifyRegistry objects 346 may include the name of the notification to dispatch, the user to dispatch the message to, and the transport mechanism to use to send the message (i.e. e-mail or pager).

A MinionLog object 348 represents a log message written to the MinionLog table by a minion. The MinionLog table is a general purpose area where any minion can store persistent advisory messages. A MinionLog object 348 may include the name of the minion that posted the message, when the activity occurred, an "activity code," an arbitrary message, and the ClientBase object 314 and/or Project object 316 that the minion was operating on when the message was saved A State object 350 simply associates a standard abbreviation for a state that is a member of the USA with the full state name. A ZipCity object 352 is a utility object that associates zip codes, counties, and states together.

Security Persistent Objects

An Action object 354 describes the operations that a user can perform with the system. These Action objects 354 can be grouped into ActionGroup objects 356. A given Action object 354 can be a member of zero or more ActionGroup objects 356. A given UserID is associated with a ClientBase object 314 and an Action object 354 through a Permission object 358. In other words, a particular user can only perform a certain Action object 354 on a ClientBase object 314 if there is a Permission object 358 for it.

An ActionGroup object 356 groups one or more actions together. ActionGroup objects 356 are an administrative convenience for assigning a collection of Action objects 354 to a UserID and ClientBase object 314 rather than having to assign them one at a time.

A Permission object 358 associates a User object 360 with a ClientBase object 314 and an Action object 354. There will be one of these objects for every Action object 354 that a particular User object 360 is allowed to perform on a given ClientBase object 314.

Session Management Persistent Objects

A ClientBase object 314 contains database and system resource management information for the different clients. This information may include a client name, database connection and access information, database status, default billing information, directory locations for data files associated with the client base object, and default resource expiration information. ClientBase objects 314 may have zero or more Project objects 316 associated with them. A particular ClientBase object 314 and its associated Project object 316 are only accessible by User objects 360 that have permission to work with those Project objects 316. A ClientBase object 314 may have a finite lifetime (i.e. it may only remain active for a period of time, then be taken off the system), or may be essentially perpetual.

DataSpace objects 362 describe the data spaces on disk where the database servers store table and index data. DataSpace objects 362 may describe the name of the data space, whether the data space is a "project" table data space or a "production" table data space, a brief description of the data space, and the ClientBase object 314 associated with the DataSpace object 362.

A Project object 316 is a named collection of work associated with a ClientBase object 314. A Project object 316 may include a description of the project, a project code and status, archival information, and information about where to store flat files associated with the project. Project objects 316 can be associated with one ClientBase object 314, zero or more DataTable objects 330, zero or more DataFile objects 328, zero or more PhysicalMedia objects 332, zero or more JobStream objects 322 and ProcessStream objects 326, zero or more Session objects 364, one MatterNum object 308 for disk usage billing, and one MatterNum object 308 for processing billing.

All User objects 360 that have access to a particular ClientBase object 314 are able to access all of its Project objects 316. Multiple Sessions (and therefore multiple User objects 360) may work on a Project object 316 concurrently.

A Session object 364 is a combination of a particular Computer and Context that represents a connection from a particular workstation to a project on behalf of a User object 360. A Session object 364 is always associated with exactly one Project object 316 and therefore with exactly one ClientBase object 314. Sessions are created when User objects 360 connect to the present invention from some workstation application, and are used in nearly all other system messaging to establish the context in which those messages should execute. A User object 360 on a particular workstation computer may establish exactly one Session from that workstation. However, a User object 360 may establish concurrent sessions from different workstations.

A SysDefault object 366 stores default values for the present invention. These default values consist of key-value pairs in the form of strings. A UserDefault object 368 stores user-dependent default values for the present invention. These default values consist of key-value pairs in the form of strings, and can vary from one user to the next.

A User object 360 represents a user of the present invention. A User object 360 is allowed to work on selected ClientBase objects 314, and has access to all Project objects 316 associated with those ClientBase objects 314. A user may connect to (i.e. establish a Session with) the present invention from any workstation computer that is able to communicate with the system, and may have concurrent Sessions from multiple workstations, limited to a single Session on a particular workstation.

The Expression object 370 contains expression and function information used by applications. The ClientExprAssoc object 372 contains each valid expression for each ClientBase object 314. The eo_sequence_table 376 keeps track of the last original identifier assigned to each object. The Security Guard table 378 contains the userid and encrypted password for each valid user of the system. Only the security guard 136 (FIG. 1) has access to this table.

Client Objects

Figure 7A:
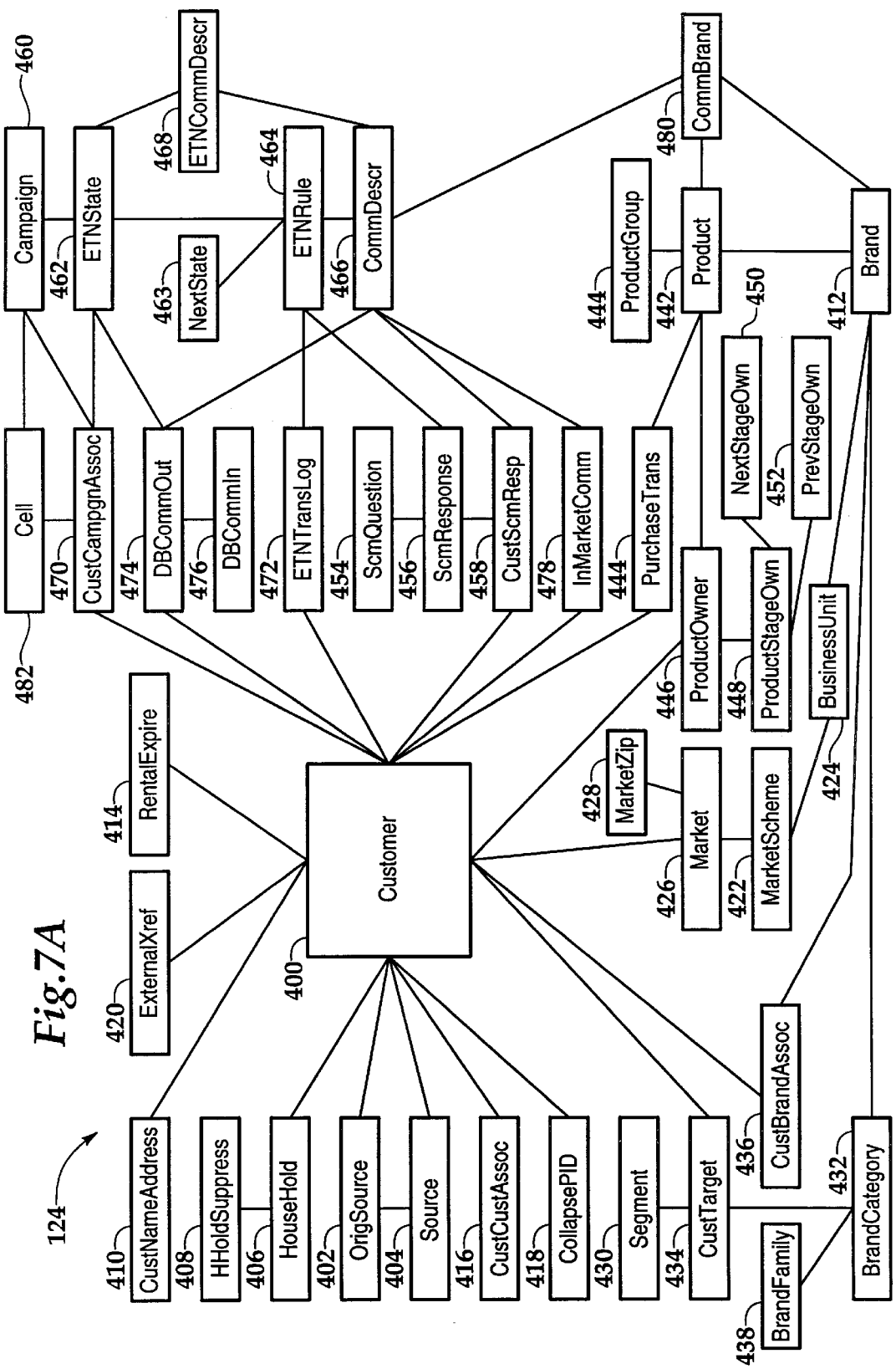
FIGS. 7A and 7B are block diagrams of the persistent objects comprising the client objects 124 (FIG. 1) in accordance with one possible relational embodiment of the present invention.

Referring now to FIG. 7A, a block diagram of the persistent objects comprising the client objects 124 (FIG. 1), in accordance with one possible relational embodiment of the present invention, is illustrated. The present invention is not limited to the specific client objects 124 described or to the relational embodiment illustrated in FIG. 6. Those persons skilled in the art will recognize that the present invention is designed to allow client objects 124 to be added, deleted or changed, and the relationships between the client objects 124 to be changed according to the intended application of the present invention. The relational nature of the client objects 124 allow the present invention to be modified without extensive recoding.

Customer & HouseHold Tables

OrigSource 402 provides a tracking mechanism for changes in the Source 404 of a given Customer 400. The same Customer 400 information may be obtained from a number of different Sources 404 over time, often it is ignored as duplicate data. OrigSource 402 can be used to determine whether to quit buying from a particular source if a high percentage of duplicates with a different (cheaper) Source 404 are produced. If such a determination is desired, a row is inserted into OrigSource 402 each time information from an existing Customer 400 is received that indicates a different Source 404.

HouseHold 406 is a grouping table wherein each row represents a group of Customer 400 rows that have the same address info in the CustNameAddress table 410. There will be one HouseHold 406 entry per unique customer address. A row is inserted into HouseHold 406 the first time a Customer 400 row is added for a given address. HouseHold 406 carries information that is common to all customers at a given address, such as whether the property is owned or rented.

HHoldSuppress 408 provides a method of suppressing mailings to particular HouseHolds 406. HHoldSuppress 408 can be used to suppress mailings for specific Brands 412, but not for other Brands 412. Typically, mailings are only suppressed for a specified period of time. Thus a cleanup process is periodically used to delete expired rows from the table.

Source 404 is a look-up table used to identify the information "source" for a given customer. A row cannot be inserted into the Customer table 400 without referencing an existing entry in the Source table 404. Prior to loading customer data, the Source table 404 is populated with all potential sources of customer data. Source 404 can also be used to provide a way to give one source "priority" over another. In such a case, two or more sources are received from the same Customer 400. Thereafter, a rule such as "If I get two sources within one week of each other, pick source A over source B" can be used.

Customer 400 and CustNameAddress 410 are two tables that combine to provide information specific to each customer. The Customer table 400 contains most of the demographic data. The CustNameAddress table 410 contains the name and address components. In general when the generic term "customer" is used, it is referring to the combination of three tables: Customer 400, CustNameAddress 410, and RentalExpire 414. A unique identifier for the customer called the PID, which stands for Person Identifier, is stored in Customer 400. Mailings are designed such that when a customer response comes in, it will contain the PID for that customer so that the response can be cross-referenced back to the right customer in the database.

RentalExpire 414 is only used if the Customer 400 is a "rental", which means that it was purchased from a list provider. A rented name can only be used for a specific period of time, unless the customer converts from being a prospect to an actual customer during that time. Conversion typically occurs as a result of responding to a promotion, or purchasing the client's product. This table has a one-to-one relationship to the Customer table 400.

CustCustAssoc 416 is an association table that records how one customer is related with (i.e. associated to) another customer. Examples include: "Cust A referred Cust B to this brand" or "Cust A is a parent of Cust B."

CollapsePID 418 is a table wherein a row is inserted when two or more "customers" are found in the database with the same name and address. Thereafter, a process can "collapse" these multiple customers into one Customer 400 row, essentially eliminating duplicate customer data. Any data that was tied to collapsed customer's PID is moved under the remaining customer PID. If correspondence comes in that references a PID which is not found on the Customer table 400, this table is checked to see if the PID has been collapsed and is now known by another PID. Typically, the CollapsePID 418 row is not deleted until a sufficient time period has elapsed to insure that no more correspondence comes in which references the original (i.e. collapsed) PID.

ExternalXref 420 allows a customer to be tracked using an identification number that is separate from the internally generated PID number. Clients often have a database of customers and will have already assigned their own identifier to each customer. The ExternalXref table 420 allows these externally generated identifiers to be cross-referenced back to the right customer in the database.

Market Tables

MarketScheme 422 is a grouping table that allows a business unit to define different schemes for dividing their market into different areas. For example, business unit "AA" may use a "SCHEME-1" which is a hierarchy of regions, districts, and zones to identify the market areas; whereas business unit "BB" uses "SCHEME-2" which is a more flattened approach of North/South/East/West.

BusinessUnit 424 identifies each business unit within a client Organization. Business units can range from departments to whole companies, depending upon how the company needs to do reporting.

Market 426 is a grouping table that describes (i.e. gives a name to) a given market or market area. It allows for a hierarchy of up to five levels to be defined, although the hierarchy needs to be inverted when this table is populated. For example:

MarketLevel1=DFW

MarketLevel2=TEXAS

MarketLevel3=SOUTHERN U.S.

MarketLevel4=DOMESTIC

MarketLevel5=<null>.

MarketZip 428 provides a way to assign zip codes to particular markets. Zip codes are often used to assign customers to market areas. There are a number of other possibilities, such as FIPS code, county, etc. The standard data model will provide this table for zip codes, but other methods will have to be tailored to each client according to their needs. Alternatively, the database may allow for zip code "ranges" rather than individual zip codes.

Brand Tables

Segment 430 is a grouping table that gives a name to the segments that customers may be assigned to. Most often, the segment is an indication of how often a customer uses products in the client's brand category. Examples of this type could be "Heavy," "Medium," or "Light." Accordingly, Segment 430 can be used to categorize customers according to their potential use of a client's brand category.

BrandCategory 432 is a grouping table that names the general brand category that the client competes in. An example might be "SOFT DRINKS." BrandCategory 432 may also include data that tells how the client wants to measure customer use of products in this brand category. For example, they may want to measure "cases per month", "uses per week", or "nights stayed in last 12 months".

CustTarget 434 is an association table between Customer 400 and BrandCategory 432 that can store which particular segment a customer is in for this brand category. CustTarget 434 may also contain volume information that can be later used to segment (or re-segment) the customer.

Brand 412 is a grouping table that names the brands being tracked on behalf of the client. Note that competitive brands may be included.

CustBrandAssoc 436 is an association table between Customer 400 and Brand 412. CustBrandAssoc 436 stores data about the relationship a customer has with a given brand. For example, "Out of the last 10 times you have used a product in this brand category, how many were for brand X"?

BrandFamily 438 represents brand families for a particular client.

Products and Purchase Transactions Tables

ProductGroup 440 is an optional grouping table that can be used to group related products. For example, a client that sells several printer models and accessories may wish to group their products according to product lines, such as "laser printers", "ink jet printers", or "printer accessories".

Product 442 lists information about each client product or service. A specific product should not be in more than one product group. For example, if the product was a printer model "XLT-1200", it should not be in both the "laser printers" product group and the "business use" product group.

PurchaseTrans 444 is an association table that associates a Customer 400 with a particular Product 442 in the form of a purchase.

ProductOwner 446 associates a particular customer with particular products that the customer owns. ProductOwner 446 also indicates of the type of ownership (e.g. "owned by" or "used by"), and the serial number of the owned product.

ProductStageOwn 448 defines "stages" of product ownership. Each ProductOwner 446, which associates a customer with an owned product, is also associated with a ProductStageOwn 448 that defines the stage of the ownership.

NextStageOwn 450 represents the next possible stage of ownership.

PrevStageOwn 452 represents the previous possible stage of ownership.

Screener Tables

ScmQuestion 454 records all screener questions. Each question is recorded once, even though it may appear in several different communications. ScmQuestion 454 allows a particular question to be dependent upon another question, or the response to that question. An example of this would be:

---

Q1. Which of the following brands of soft drink do you use most often?
   a) brand x     b) brand y     c) brand z Q2. How many times last month did you purchase your favorite soft drink brand?
   a) 0–2     b) 3–7     c) 8 or more

---

In the above example, the answer to Q2 would depend upon the answer to Q1. In addition, ScmQuestion 454 determines how to treat multiple responses (from the same customer) to a question that is being asked on several communications. Among the available options are (1) Keep only the last response, (2) Keep all responses, or (3) Keep all unique (different from any previous) responses.

ScmResponse 456 contains rows that represent a valid response to a question in the ScmQuestion table 454. In the case of a question with four possible choices labeled A through D, there would be four rows in this table that pointed back to that question. Questions allowing open-ended responses will have a value of "OPEN." Note that questions should either be open-ended or multiple choice, but not both. In other words, questions should not allow a choice such as "Other" where the customer supplies a value not listed among the other choices.

CustScrnResp 458 is an association table between the Customer 400 and ScmResponse 456 tables wherein each row represents a customer response to a specific question. The response must be one of those listed in the ScmResponse table 456 as a valid response to the question.

Campaign Management (Event Transition Network) Tables

The event transition network ("ETN") is a mechanism that tracks and moves customers through marketing campaigns. In general, ETN describes a data structure (a group of "states") and a set of rules that moves an item from one state to another. From a marketing perspective, a customer is moved through various states of a marketing campaign with each state being associated with specific communications and responses. After the campaign ends, the final states of all customers are analyzed. One advantage of the ETN approach is that a single mechanism is used to set up marketing campaigns of arbitrary complexity. Moreover, how and when customers move from one state to another can be controlled.

The ETN approach also makes it much easier to establish and track research groups. For example, specific attributes are set up for states that describe whether customers in a given state are involved in a research group, and if so, whether the customers are part of the control group or test group. The ETN design also provides the following features: standardized process to ensure consistent quality; mechanisms to automatically or manually move customers through a multi-phase marketing campaign; provisions for interactive, event-driven response and subsequent communication generation; and tracking of current state and total path through the network for any single customer. The marketing campaign comprises the following tables:

Campaign 460 is a grouping table that represents or gives a name to the marketing campaign or promotional program. Each campaign will consist of one or more ETNStates 462. Simple campaigns may only have one state with a single communication.

ETNState 462 defines all the valid "states" for the marketing campaign or promotional program. During a marketing program, each customer will start at the beginning state and progress through one or more states until the terminating (i.e. last) state is reached. In a typical multi-path marketing program, all customers will start out at the same beginning state, but during the course of the program, customers will progress through the remaining states at different rates and will not necessarily take the same path to the terminating state. Entry into a particular state will typically trigger an associated communication with the customer.

ETN Rule 464 defines the rules for progressing from one ETNState 462 to the NextState 463. ETN Rule 464 contains the state that the customer is currently in and the state that the customer will progress to if the rule condition is met. When the condition is met, the rule is said to "fire" or "trigger." The rule can be based upon how much time elapsed since getting to the current state or upon the successful completion of an arbitrary SQL statement that is stored in ETN Rule 464. In addition, there can be more than one rule that moves a customer from one state to another. TransitBatchMinion performs the actual transition between ETNStates 462. Transitions from one state to another are triggered in one of the following ways:

| | |
|---|---|
| CommDescr 466 | Customer responds to a communication |
| ScrnResponse 456 | Customer responds to a screener question |
| SQL | Customer satisfies some user specified SQL statement |
| Default | Customer transitions to new state by default after some user specified period of time passes. |

The response mechanisms can be set to trigger for a specific range of dates. A default rule is required if the state is not defined as a termination state. This ensures that the customers will eventually transition into a termination state. For example, one rule for "State #2" might specify that the customer can get to "State #4" by giving a particular response to a screener question, and another rule for "State #2" might specify that the customer can get to "State #4" by satisfying an SQL statement that identifies the customer as a "heavy" user of the brand. ETN Rule 464 also provides the capacity to determine the order in which rules are evaluated.

ETNCommDescr 468 is an association table between the CommDescr 466 and ETNState 462 tables. ETNCommDescr 468 specifies which communication(s) are tied to which state(s) in a marketing campaign. When the customer progresses through the various states in a marketing campaign, this table is used to identify which communications are sent to the customer.

CustCampgnAssoc 470 is an association table between the Customer 400 and ETNState 462 tables. CustCampgnAssoc 470 specifies which state a particular customer is in for a given marketing program because a customer may be participating in more than one marketing program at a time, and therefore would potentially be at different states for each program. All customers are enrolled in the campaign using standard processes. It is possible to add customers to the campaign at some later time or to remove them from participation. Once placed in an initial "starting" state, customers can be moved into specific states associated with the initial communication based on a set of transition rules.

ETNTransLog 472 provides an optional audit trail that tracks the path each customer took through a marketing program and the most commonly travelled paths through a marketing campaign to be determined. ETNTransLog 472 is optional in that it is only populated if the ETNRule 464 specifies that it should be logged when this rule fires (i.e. condition is met).

CommDescr 466 describes each communication that can be sent to a customer. CommDescr 466 can also be used to describe incoming communications either from the customer, client, or a vendor.

DBCommOut 474 is an association between Customer 400 and CommDescr 466 that records which communications have been sent to each customer. This information can be moved to a log file after some period of time. Archiving of customer data will also force the archive of all related communications records.

DBCommIn 476 records the response by the customer to a marketing communication. The response can be quite simple, such as "responded", or more complex where there are multiple responses to the campaign possible.

InMarketComm 478 is an association between Customer 400 and CommDescr 466 that records incoming communications.

ComnIBrand 480 is used to identify which communications have been set up for a given brand or product. And conversely, CommBrand 480 can be used to look up what brands and/or products are being marketed in a given communication.

Cell 482 is an arbitrary grouping into which customers are placed for a promotion event. These groupings are created for research purposes, and can be queried during later data processing. An example of a cell might be "white females under the age of 30," or "people who live in Texas." The Cell 482 basically consists of an arbitrary code and description. Cell 482 coding is typically performed during the data extract process.

The following steps outline the standard process for preparing communications for a marketing campaign. These standard processes help to ensure an acceptable level of quality in the preparation of data for various entities.

1. Marketing Campaign Design
   Specify the various ETN states.
   Determine which states are considered termination states.
   Specify rules to transition from non-terminating states.
   Specify which communication will be sent for each ETN state.
   Specify which ETN states are part of a research test group.
   Specify which ETN states are part of a research control group.
2. Communication Table Content
   This includes customer PID, name, address, and perhaps other demographic information. It is possible to send more than one communication to a single customer entry.
3. Point-In-Time Information
   PIT information can be pulled for test, control or the target group for use on post-analysis. The PIT information is exported from the database and delivered to the analysis user. No further tracking of the PIT project table of exported data is maintained.
4. Specify Rules for Suppression and Uniqueness
   Normally, suppressed customers and households involved in research are excluded from the communication table. Uniqueness requirements can specify that the communications should be unique by customer id or by household id. Further a household can be defined as a single building address or all people with the same last name living at the same address.
5. Quantities & Selection Criteria
   Specify the quantities for each of the ETN states and the methods that should be used to select these quantities.
6. Extraction of Qualifying Universe
   Extract all customers that could qualify for any of the ETN states. This will form the basis of the gross universe table for this marketing campaign.
7. Execute Process Campaign Management includes tasks that track an individual customer through the stages of a marketing campaign. Examples of Campaign Management processes include EtnPrep, EtnAssign, EtnEnroll, CommGenerate, CommReversal, and EtnTransitBatch.

CommGenerate generates one or more communication records for unposted communications. The communications are placed in a new project table with added delivery information such as name, address, phone, e-mail and the relevant communications codes. The necessary rows are posted to the commOut table, and suppression by household is also performed.

CommReversal assists the user in reversing a communications posting. It will remove rows from the dbcommout table, and clear suppressed households.

EtnAssign assigns ETN states to customers based on a set of parameters specified by the user. The user can elect to assign states to all customers or choose among customers based on priority.

EtnEnroll enrolls customers in a marketing program. The customers will already have been assigned an ETN state by the minion EtnAssign. The enrollment process creates associations between customers and ETN states within the client database. These associations are stored in the table custCampgnAssoc EtnPrep prepares a user-specified project table for ETN state assignment. This preparation involves adding a column for ETNstate and then removing suppressed and duplicate customer rows.

EtnTransitBatch performs the transition from one state to another for all eligible participants in the custETNassoc table. These transitions are based on the ETN transition rules as defined by the user.

Figure 7B:
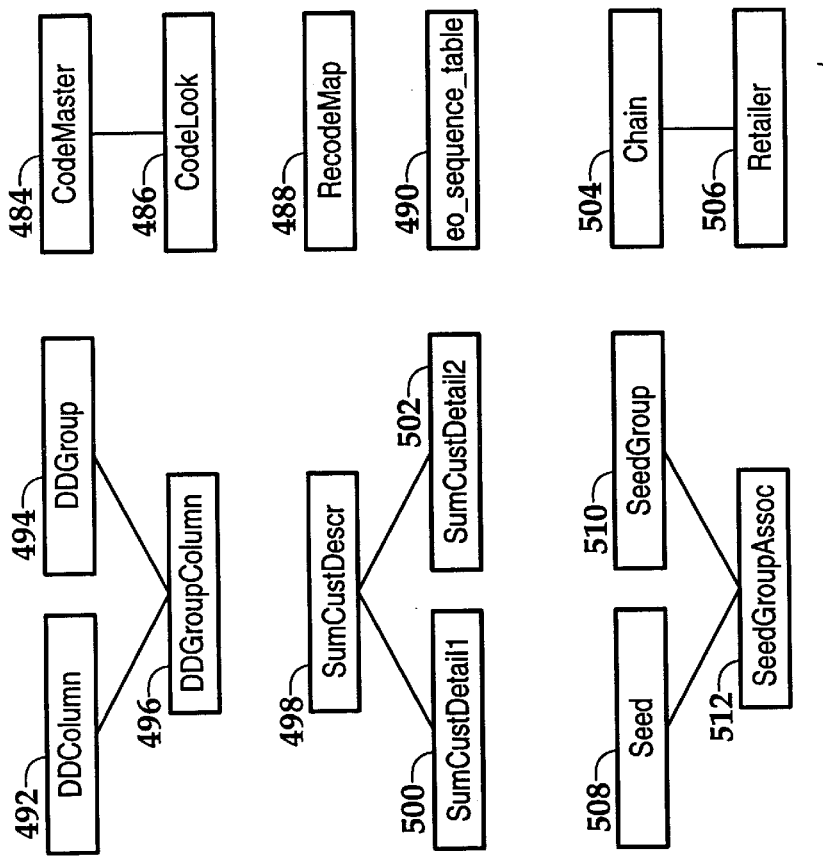

Miscellaneous Tables:

Now referring to FIG. 7B, another block diagram of the persistent objects comprising the client objects 124 (FIG. 1), in accordance with one possible relational embodiment of the present invention, is illustrated. The following tables are similar in that none of them are used to store client data. Instead, they are used to help direct the application software processes that need to validate and load incoming client data.

CodeMaster 484 contains a list of column names that appear in one or more other tables and have a pre-defined set of valid values that can be assigned to them. This table, along with the CodeLook table 486, provides a convenient way for the application to validate incoming data.

CodeLook 486 stores the list of valid values for columns named in the CodeMaster table 484. The application compares incoming data for a column named in CodeMaster 484 against this list of valid values. Each row contains one valid value for a given column in CodeMaster 484.

RecodeMap 488 is used by the application to translate certain incoming column values into other values. For example, an input file may contain the words MALE or FEMALE to indicate the sex of the customer, but information needs to be stored as M or F.

Eo_sequence_table 490 assigns the next sequential value to a given table's primary key column. In the present invention, every table has an "artificial" primary key called an "Object ID" (OID). The value stored in the primary key of each table is a system generated sequential number. The application uses eo_sequence_table 490 to determine the next primary key value that is to be assigned for each table in the client objects 124.

DDColumn 492 is one of three tables used together to group related column names. DDColumn 492 stores the name of each column used throughout the client objects 124. Along with the column name, it also stores a brief description and what "type" of data it contains (e.g. DATE, CHAR (8), INTEGER, etc . . . ).

DDGroup 494 is one of three tables used together to group related column names. DDGroup 494 names each group of columns to improve consistency in the various data pulls that are requested. A special group called "WORKING" is reserved and should be used to add columns that are temporary or are not yet added to the data model.

DDGroupColumn 496 is one of three tables used together to group related column names. It is an association table between DDGroup 494 and DDColumn 492. DDGroupColumn 496 identifies which columns are in a given group.

SumCustDescr 498 represents descriptions of a table summarization that can be made for reporting purposes. SumCustDetail1 500 and SumCustDetail2 502 represent particular runs of a summarization.

Chain 504 represents a particular retailer chain and Retailer 506 represents retailers associated with a retail chain.

Seeds 508 are persons who are intentionally added as the destination of promotion pieces to aid in tracking when pieces get delivered. SeedGroup 510 is a group of seeds and SeedGroupAssoc 512 is an association table between Seed 508 and SeedGroup 510.

EOFLite

Figure 8:
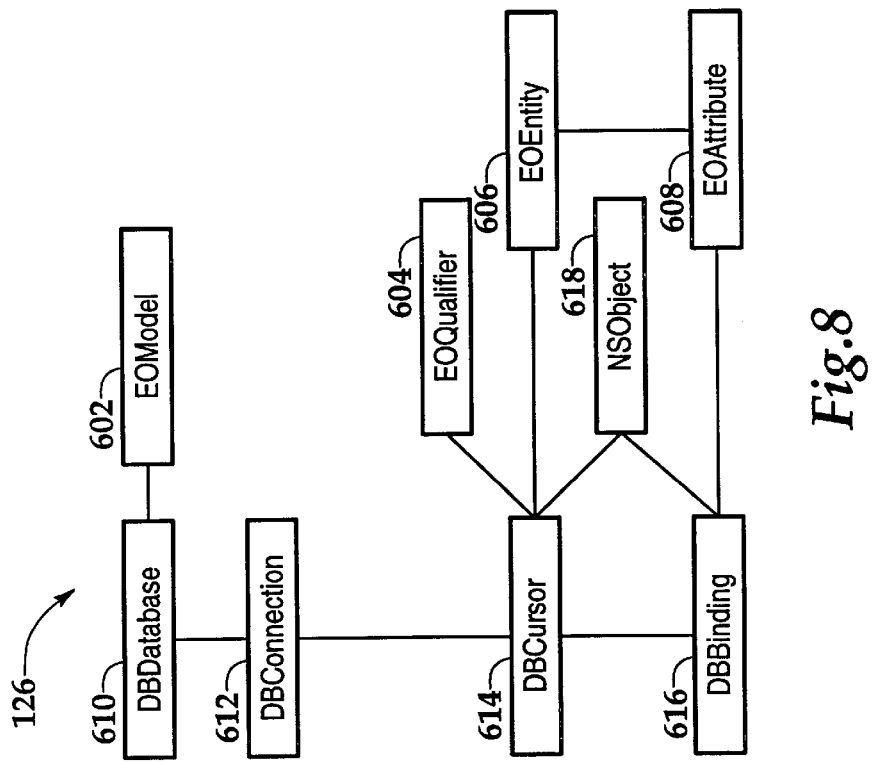
FIG. 8 is a block diagram of the EOFLite components 126 (FIG. 1) in accordance with a preferred embodiment of the present invention.

Referring to FIG. 8, a block diagram of the EOFLite components 126 (FIG. 1), in accordance with a preferred embodiment of the present invention, is illustrated. The EOFLite components 126 are designed to provide a "lightweight" binding layer for moving data back and forth between the client database 114 and high-volume "batch" processes. The EOFLite components 126 create instances of custom classes without having to live with the overhead inherent in the lower-level EOF frameworks, which are designed more for OLTP-type processing than for record-by-record batch processing.

The EOFLite components 126 are designed to work with the same enterprise object classes that are used with EOF, so that a single object model can be developed that works the same for both interactive and batch processing (i.e. the same business logic will be used by both). The major classes in EOFLite are designed to model familiar database concepts, such as the database itself, connections to the database, cursors in a connection, and bindings between the data being manipulated by a cursor and some object that is to be populated with that data. These components supplement the basic EOF "primitive" classes, such as EOModel 602, EOQualifier 604, EOEntity 606, and EOAttribute 608, and when used together result in a much more efficient mechanism for performing batch processing. The EOFLite components 126 are as follows:

EOModel 602 describes the database that is represented by this DBDatabase 610 instance. The model contains connection information, and a description of the tables in the database and the relationships between them.

EOQualifier 604 is the qualifier that the receiver uses to qualify data selects.

EOEntity 606 describes which table to operate on, and the columns in the table that should be retrieved when the receiver fetches data.

EOAttribute 608 represents the table column whose data the receiver is binding to its object.

DBDatabase 610 represents a single physical database. Each instance of this class can be associated with zero or more DBConnection 612 instances.

DBConnection 612 represents a physical connection to a single database. Each connection can have zero or more cursors operating through it.

DBCursor 614 represents data cursors operating through a connection. These instances are configured for a single entity and an associated class of objects whose instances will be populated with the data retrieved by the cursor.

DBBinding 616 represents bindings between a single EOAttribute 608, which represents a single column in a table, and a single instance variable of an object. These "bindings" are used by instances of the DBCursor 614 to map data between the attributes of an EOEntity 606 and the instance variables of the cursors prototype object.

NSObject 618 is the object to and from which data is being mapped by the receiver.

String is a lightweight implementation of NSString that provides more external access to the internal representation of the string, and minimizes the amount of memory allocation overhead that takes place during string manipulation. This class is primarily provided as an optimization for batch processes that cannot afford the performance overhead of the NSString class.

Number is a lightweight implementation of NSNumber that minimizes the amount of memory allocation overhead that takes place during data manipulation. This class is primarily provided as an optimization for batch processes that cannot afford the performance overhead of the NSNumber class.

CalendarDate is a lightweight implementation of NSCalendarDate that minimizes the amount of computation overhead involved to manipulate dates. This class is primarily provided as an optimization for batch processes that cannot afford the performance overhead of the NSCalendarDate class.

User Interface Tier

The user interface tier comprises native OpenStep applications running on the end-user workstations. Alternatively, the system can include web-brower interfaces to support connections to the system over the Internet. The front-end applications in the user interface tier are Production, SysAdmin, and OpCon.

The Production application is the interface that provides access to the following production processes and procedures: importing client data; reformatting and recoding of client data; making name and address corrections to incoming customer information; suppressing selected incoming records from inclusion in the client database; merging incoming customer records with existing records in the client database; and extracting selected client data for various purposes.

The SysAdmin application is the administrative interface to the present invention, and provides support for the following processes and procedures: administration of the agents running on the various machines in the system; administration of the job management system; maintenance of the user and security tables; and sundry table maintenance.

The OpCon application is the interface to the present invention for the Operations group, and provides support for the following processes and procedures: maintenance of tape tracking information; and posting messages to system operators (such as requesting a tape mount or alerting the operator about an observed system malfunction).

User Production Application

The four major processes in the user production application are: Import and Update; Querying/Extraction; Reporting; and Campaign Management. These processes are grouped according to the results they produce for the user. The user of the present invention can create job streams (sets of work process configurations grouped together so that they can execute without user intervention) to support these major processes. Some of the tasks within job streams, such as TapeContents and DataDump, can be used to support all four categories listed above.

Import and Update:

This process includes all the tasks necessary for adding data to the client's database. Data comes in from various sources like list brokers, client-provided data and customer response data. The data is standardized and cleaned before being added to the database through the update. Examples of processes used in the Import and Update include ACEUSBatch, CustRefresh, DbMatch, NameParse, QAMacro, QAMicro, Recode, Reformat, TapeRead, and Update.

ACEUSBatch handles address correction and coding of all US address records in a project table, the customer name and address table or the DMA suppression table. It also generates the matchstring and parseAddress data used by DbMatch to match customers against the database.

CustRefresh provides address correction to new or changed database records. This process only applies to customer name and address records that have been introduced outside of the normal update procedures. These records are normally entered into the base database by online users and so can be detected by the nature of the source attribute. Other processing options are available to handle zip plus 4 changes and, if necessary, standardize the entire customer table.

DbMatch matches incoming customer records in a project table against the database. Matches by household, and individual within the household can be requested.

NameParse parses customer names into standard components and then optionally assigns a sex code based on either the name prefix or the first name.

QAMacro determines if the input file is of the expected size and record length. Only fixed length data records are supported.

QAMicro examines the contents of a project table at a detailed level. Individual columns are examined for specific content to verify the validity of the data.

Recode re-codes existing data columns or creates contents for empty columns (known as working fields) based on the input data contained in other columns.

Reformat imports data from flat files into project tables. The source of this data is typically from tape.

TapeRead moves data from tape to disk in flat file format. The capability exists to handle cartridge or round reel tapes.

Update processes additions or changes to the database based on the data contained within the project table. This process modifies data content for cleansing purposes.

Querying/Extraction:

This type of process includes all the necessary tasks for viewing the data that is in the database. The user can look for a combination of data from various tables in the client's database in order to determine what to extract and use for project tables. Project tables allow the user to house queried data extracted from the client's database in order to meet the information needs of the client. Examples of processes used to query and extract data include Export, Layout, SqlDelete, SqlSelect, SqlUpdate, SuppressDMA, TableCombine, TableDedup, TableMatch, and TapeWrite.

Export sends a project or database query to a flat ASCII data file. This process is usually performed in preparation for a job to write the exported data to tape for delivery to an outside vendor.

Layout produces a document detailing the contents of a project table. Normally, the layout is produced as part of the Export minion output, but this feature allows structure analysis of a project table at any point in the process.

SqlDelete deletes specific rows in a specified project table. Batch deletions on client data tables are not supported for security reasons.

SqlSelect runs requested SQL query expressions against the appropriate client database. The results of the query are placed in a project table.

SqlUpdate accepts a Where clause from the user and a list of columns and update expressions. The updates are then applied to all rows in the table satisfied by the Where clause.

SuppressDMA matches incoming customer records against the suppression table supplied by the Direct Marketing Association (DMA). The two types of suppression are Mail and Phone. This minion will remove records from a project table or just count the number of matches.

TableCombine combines multiple project tables into a single table. The user has the option of adding all contents to the first table in the list or creating a new output project table. Removal of all combined tables, except for the destination table, is also provided as an option. Only columns in common with the first project table in the user specified list are carried forward to the destination table. This minion performs a raw merge of data from multiple tables on common column names. There is no check for duplicate data.

TableDedup removes or updates duplicate rows in a single project table. This simple duplicate removal process can be used to keep the 'best' record of a group of matching records provided some priority column exists to order the records from best to worst.

TableMatch matches a project table (table A) against another project table (table B). The users select what type of action to perform on table A based on a successful or failed match. The match is based on a simple single column match of one table against another.

TapeWrite moves data from disk to tape in flat file format. The capability exists to handle cartridge or round reel tapes.

Reporting:

Reporting includes all the tasks for reporting the results of the extraction, data import, update and ad hoc requests. Examples of Reporting processes include Count, List, and Scan.

Count determines the number of rows that satisfy some user defined Where clause and reports that number back to the user in the job output report. For example, Determine the number of customers with suppressmail flag='Y' or the number of customers who responded to promotion ABC.

List produces a quick report of a select set of columns and rows. This process is often used to provide a quick, readable dump of a set of records from the database. For example, List the customers that have a source of "ONLINE" and have been updated within the last week.

Scan produces a frequency distribution report of the contents of one or more columns in the selected data table or view. The user can elect to perform multiple single-level scans or a single multi-level scan. For example, Scan the first three zip code characters (also known as SCF) of all customers to be included in a marketing campaign.

System Files

System Configuration File:

The System Configuration File describes the possible named configurations of the present invention. Client processes (e.g. user applications or other processes of the present invention) must specify the system they want to connect to using one of these system names.

A system configuration consists of a system name with an associated list of the names of the hosts that participate in that system.

A host description consists of a host name with an associated list of agent descriptions, and a list of the names of the agents that should be launched immediately when the agent manager agent starts on that host.

An agent description consists of an agent name with an associated agent profile (discussed in a previous section), a list of object descriptions, and a list of additional frameworks to load to support the objects the agent will manage.

The System Configuration File is used both by interface-layer minion proxies (to locate their corresponding remote objects), and by object-layer agents (to determine their profile). This means that the System Configuration File must be in at least one shared location that is accessible across all machines that participate in the system.

The exact location of the System Configuration File is configurable from the run-time environment variable CONFIGFILE, which will contain the full path of the directory where the system configuration file is located. The system must rely on this environment variable because we are running on both UNIX and NT platforms, which have differing file path syntax (in other words, it's hard for the system to assume default locations because it's not safe to assume anything about the file configuration on which the system software is running).

System Executable Files:

System executable files are located either in a local directory on every machine or in a shared directory that is accessed over the network.

Client-Specific Executable Files:

Client-specific executable files for context-dependent agents are located in a path that is obtained from the client object in the context of the session that is making use of the agent (specifics forthcoming).

System Hardware Architecture

The present invention may use a hardware configuration consisting of a four processor Sun UltraEnterprise 4000 Unix server running SunOS 5.5.1, connected to desktop PCs running Microsoft Windows NT Workstation 4.0. The network connection between the machines is 10Mbit Ethernet. The Sun Unix server hosts a disk array of 34 4.2GB hard disks for storage of database information.

Import and Update Processes

Figure 9A:
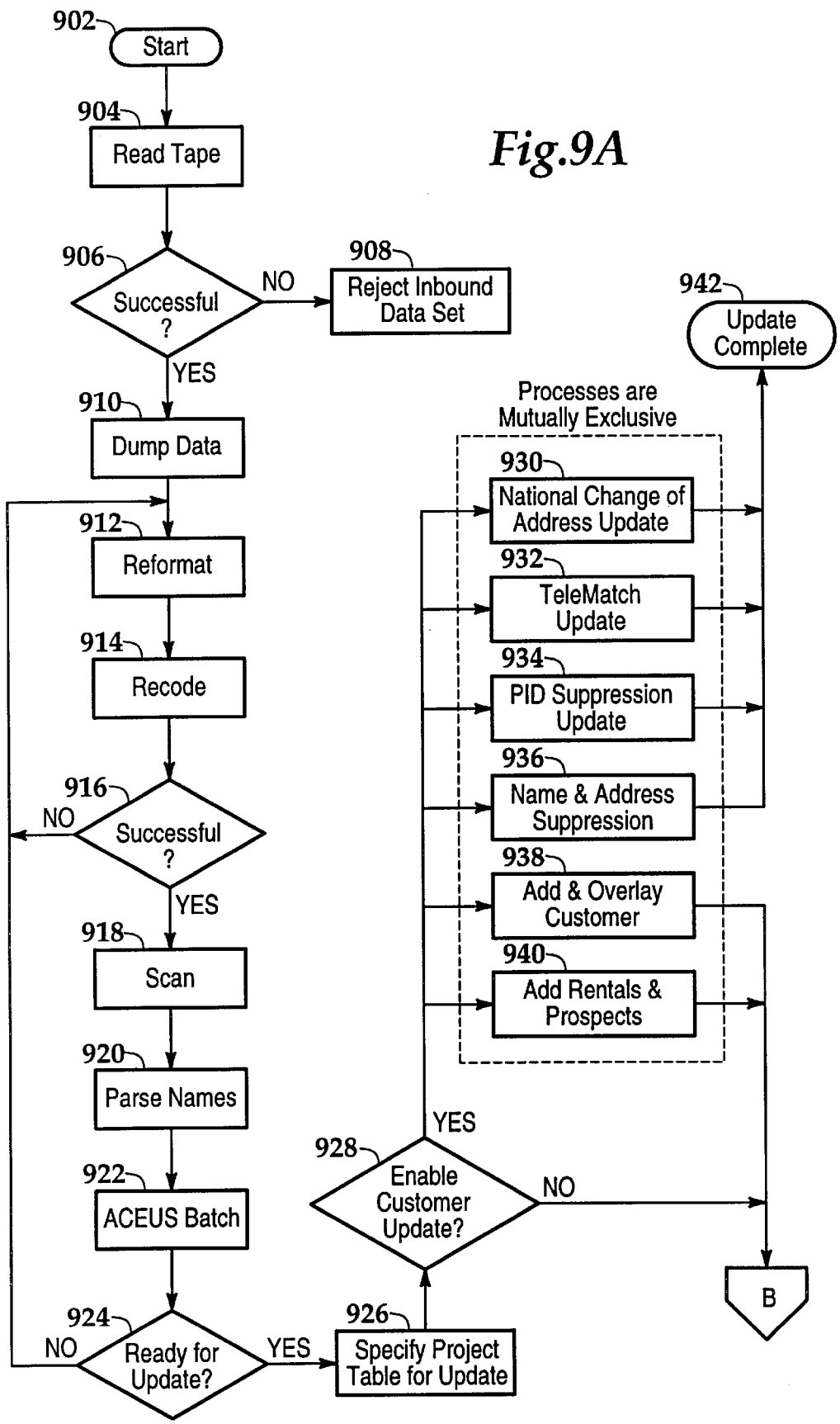
FIGS. 9A and 9B are block diagrams illustrating the import and update processes in accordance with one possible relational embodiment of the present invention.

Now referring to FIG. 9A, a block diagram illustrating the import and update processes begins in block 902. The incoming data is read from tapes in block 904 and if the read was unsuccessful, as determined in decision block 906, the inbound data set is rejected in block 908. If, however, the read was successful, a data dump is performed in block 910 and the data is reformatted in block 912 and recoded in block 914. If the reformatting and recoding of the data was not successful, as determined in decision block 916, processing loops back to the reformatting process of block 912 and processing continues as previously described. If, however, the reformatting and recoding was successful, the Scan process is performed in block 918, the names are parsed in block 920 and the ACEUS Batch process is performed in block 922. If the data is not ready to update the database, as determined in decision block 924, processing loops back to the reformatting process of block 912 and processing continues as previously described.

If, however, the data is ready, the user specifies the Project table to be executed in block 926. If a customer update is enabled, as determined in decision block 928, the user may select one of six mutually exclusive processes to perform. More specifically, the user may select a national change of address update 930, a telematch update 932, a PID suppression update 934, a name & address suppression update 936, an add & overlay customer update 938, and an add rentals & prospects update 940. The update process is then completed in block 942 after performing the national change of address update 930, the telematch update 932, the PID suppression update 934 and the name & address suppression update 936. The update process continues after the add & overlay customer update 938 and the add rentals & prospects update 940.

Figure 9B:
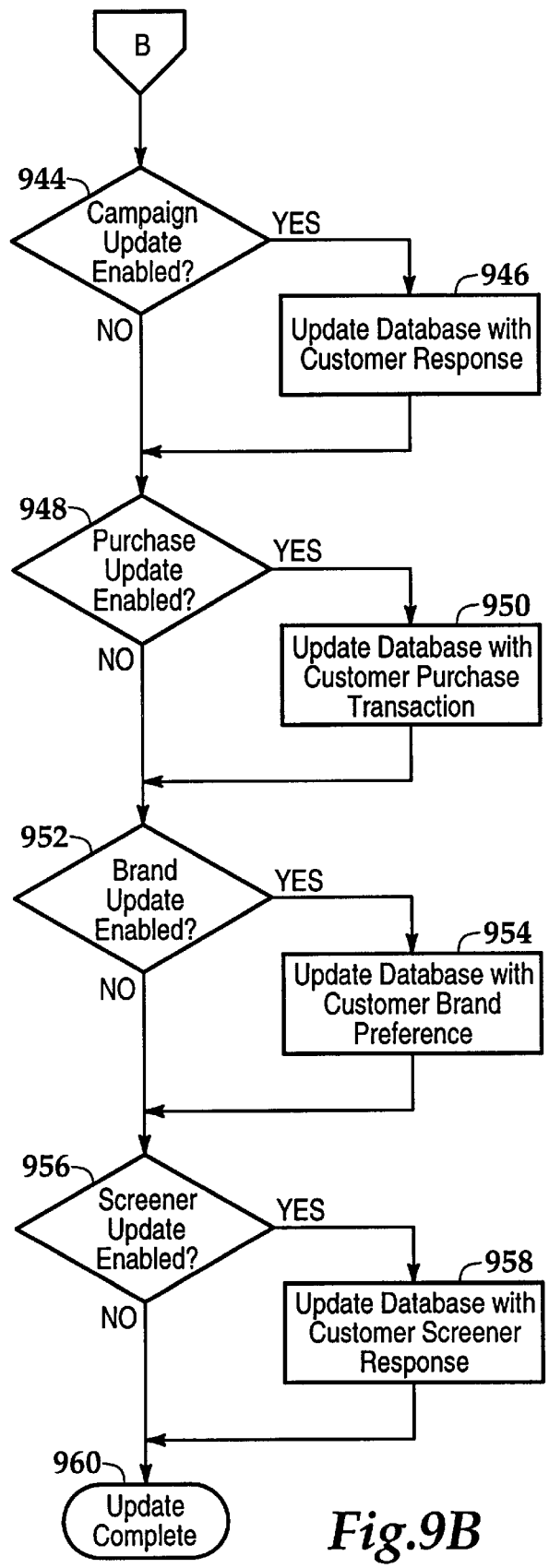

Now referring to FIG. 9B, the database is updated with customer responses in block 946 if the campaign update is enabled, as determined in decision block 944. After the campaign update of block 946 is complete, or if the campaign update is not enabled, as determined in decision block 944, the database is updated with customer purchase transactions in block 950 if the purchase update is enabled, as determined in decision block 948. After the purchase update of block 950 is complete, or if the purchase update is not enabled, as determined in decision block 948, the database is then updated with customer brand preferences in block 954 if the brand update is enabled, as determined in decision block 952. After the brand update of block 954 is complete, or if the brand update is not enabled, as determined in decision block 952, the database is updated with customer screener responses in block 958 if the screener update is enabled, as determined in decision block 956. After the screener update of block 958 is complete, or if the campaign update is not enabled, as determined in decision block 956, the update is complete in block 960.

Query and Extraction Process

Figure 10:
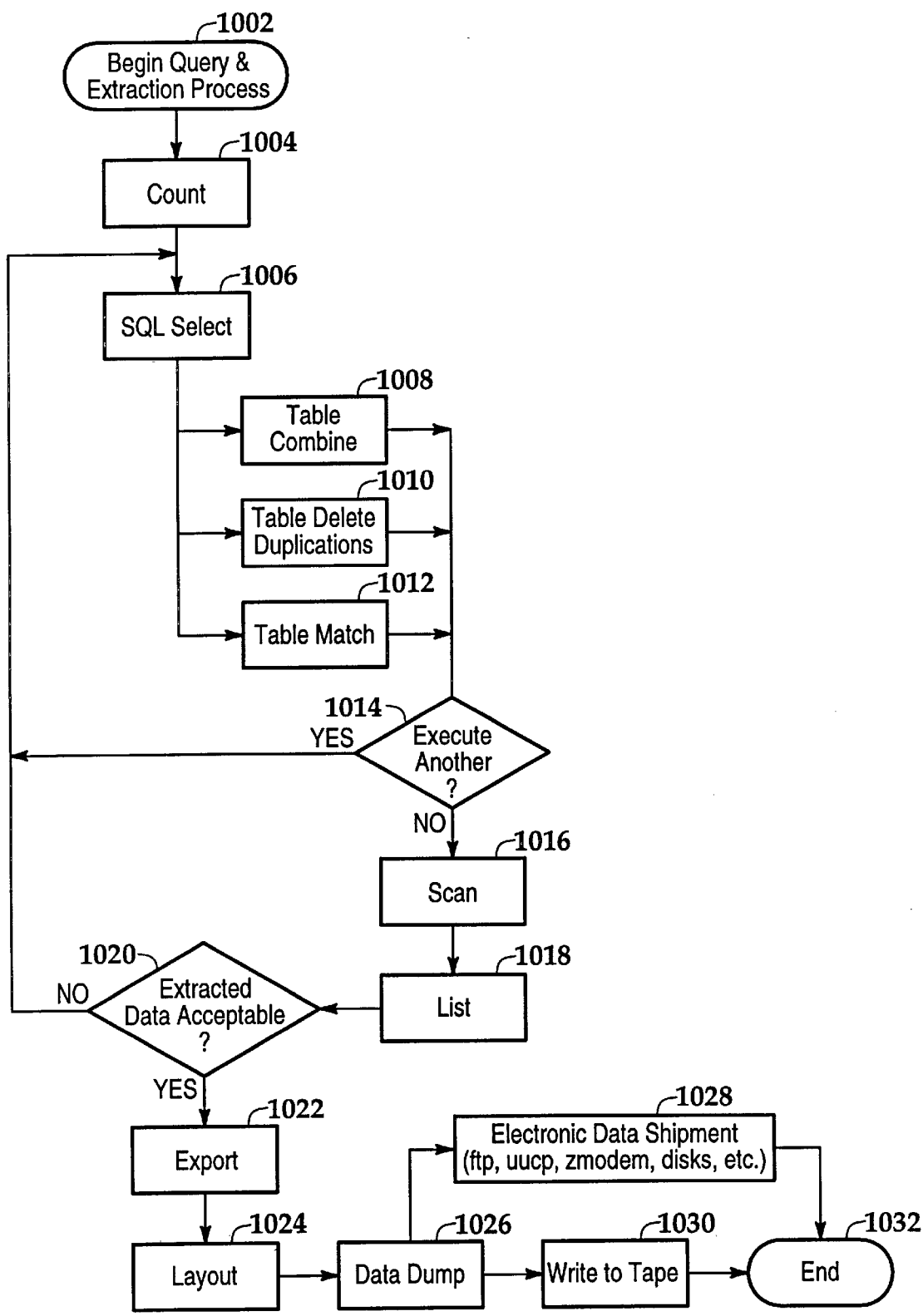
FIG. 10 is a block diagram illustrating the query and extraction processes in accordance with one possible relational embodiment of the present invention.

Referring to FIG. 10, a block diagram of the query and extraction process is illustrated and begins in block 1002. The Count process is performed in block 1004 and the SQL Select process is performed in block 1006. Thereafter, the user may select a Table Combine process in block 1008, a Table Delete Duplications process in block 1010 or a Table Match process in block 1012. After the completion of the selected process, the user may execute another of these processes, as determined in decision block 1014. If another process is to be run, processing loops back to the SQL Select process in block 1006 and the above described process repeats. If, however, the user elects to not execute another, as determined in decision block 1014, the Scan process is performed in block 1016 and the List process is performed in block 1018. If the extracted data is not acceptable, as determined in decision block 1020, processing returns to the SQL Select process in block 1006 and the above described process repeats. If, however, the extracted data is acceptable, the data is exported in block 1022, subjected to a Layout process in block 1024. The data is then dumped in block 1026 to either an electronic data shipment, such as ftp, uucp, zmodem, disks, etc. in block 1028 or to tape in block 1030. In either case, processing ends in block 1032.

Database Maintenance Process

Figure 11:
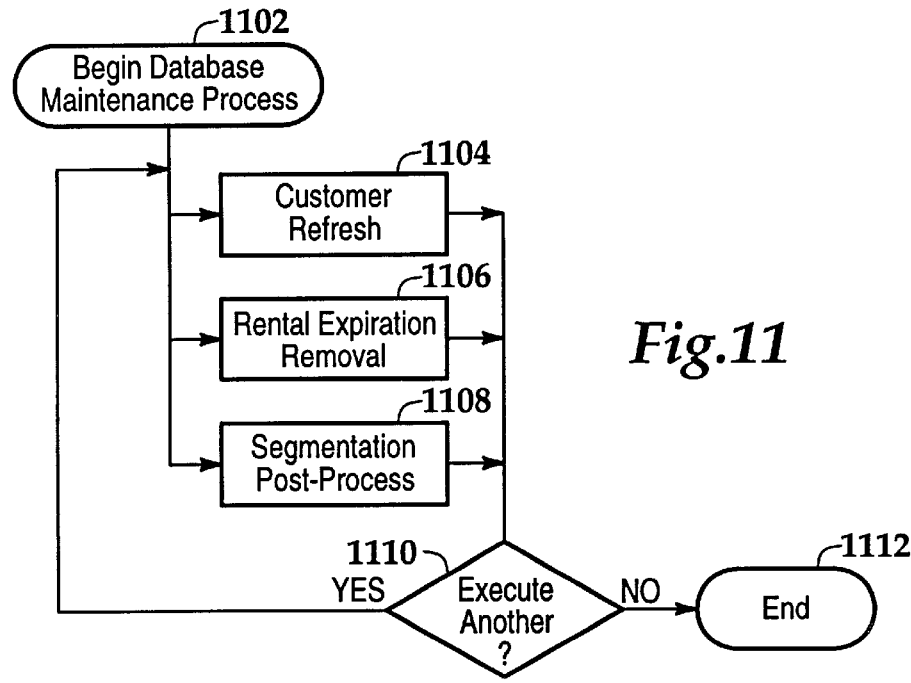
FIG. 11 is a block diagram illustrating a database maintenance process in accordance with one possible relational embodiment of the present invention.

Now referring to FIG. 11, a database maintenance process is illustrated and begins in block 1102. Thereafter, the user can run a Customer Refresh process in block 1104, a Rental Expression Removal process in block 1106 or a Segmentation Post-Process in block 1108. After the completion of the selected process, the user can execute another process as determined in decision block 1110. If another process is to be executed, processing loops back and the above describe process repeats. If, however, another process is not to be executed, as determined in decision block 1110, processing ends in block 1112.

Project Maintenance Process

Figure 12:
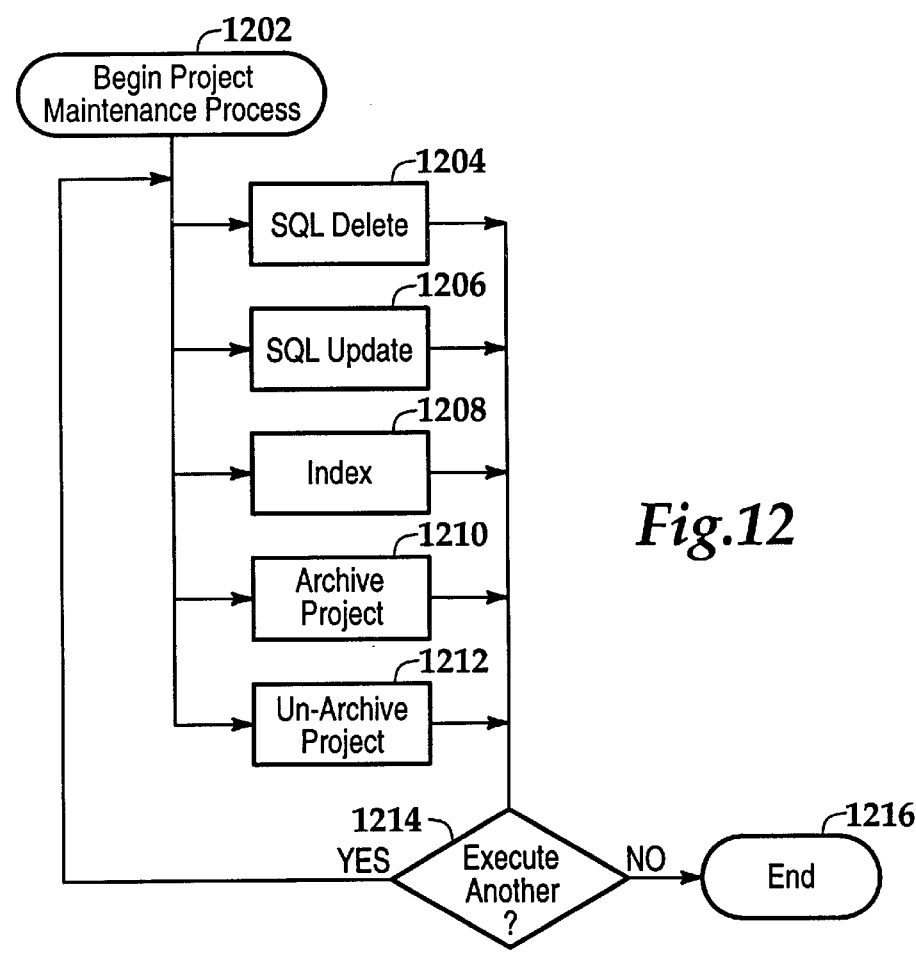
FIG. 12 is a block diagram illustrating a project maintenance process in accordance with one possible relational embodiment of the present invention.

Referring to FIG. 12, a project maintenance process is illustrated and begins in block 1202. Thereafter, the user can run a SQL Delete process in block 1204, a SQL Update process in block 1206, an Index process in block 1208, an Archive Project process in block 1210, and an Un-Archive process in block 1212. After the completion of the selected process, the user can execute another process as determined in decision block 1214. If another process is to be executed, processing loops back and the above described process repeats. If, however, another process is not to be executed, as determined in decision block 1214, processing ends in block 1216.

Communication Between External Applications and Processing Agents

Figure 13:
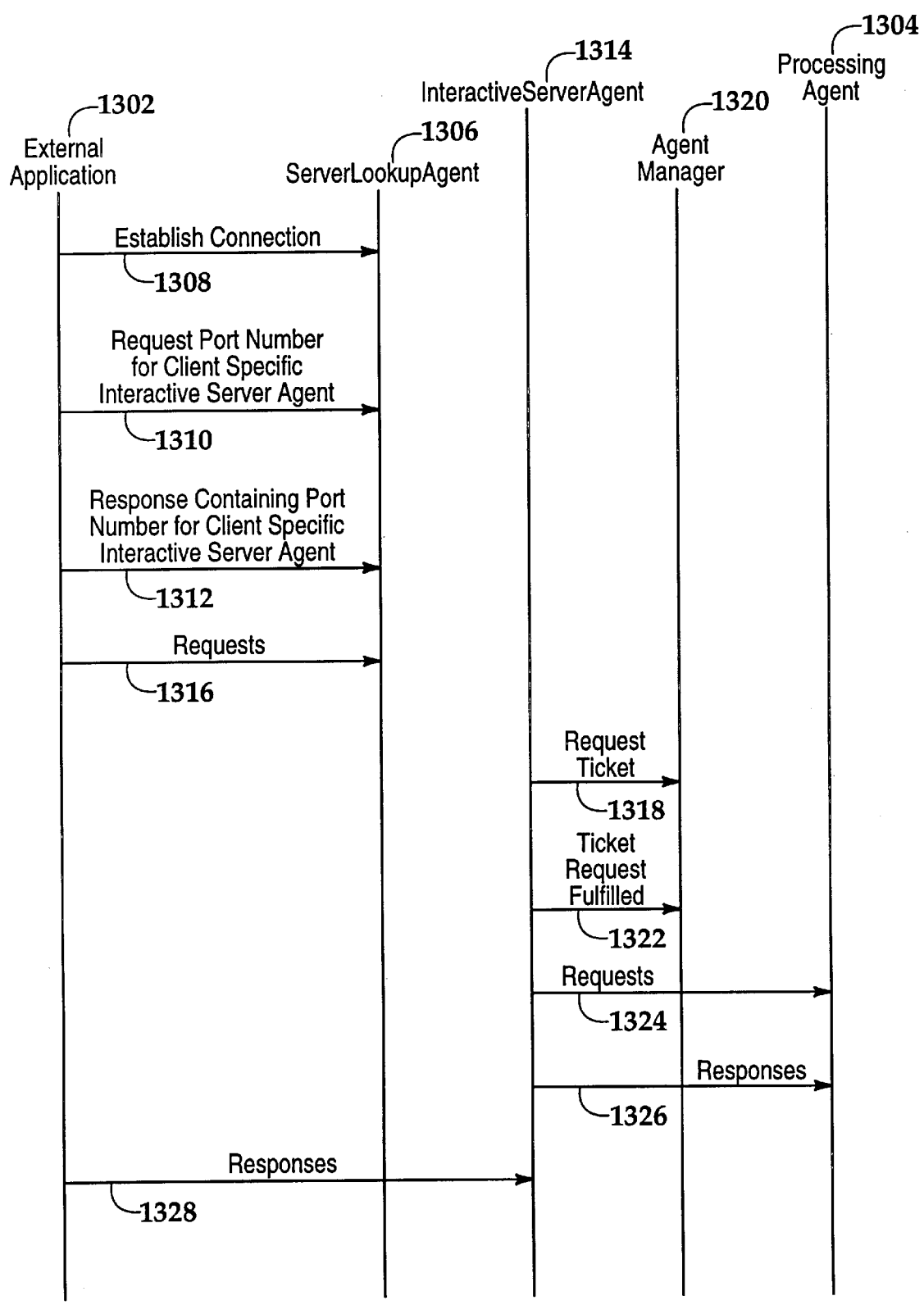
FIG. 13 illustrates how an external application communicates with a processing agent in accordance with a preferred embodiment of the present invention.

Referring now to FIG. 13, the communication process between an external application 1302, which can be web-based, and a processing agent 1304 is illustrated. The external application 1302 establishes a connection 1308 with the ServerLookupAgent 1306 using a known port number assigned to the ServerLookup Agent 1306. The external application 1302 then sends a port number request 1310 for a client specific InteractiveServerAgent 1314 to the ServerLookupAgent 1306. The ServerLookupAgent 1306 sends a response 1312 that contains the port number for the requested client specific InteractiveServerAgent 1314 to the external application 1302. Thereafter, the external application 1302 sends all future requests 1316 to the InteractiveServerAgent 1314. When the InteractiveServerAgent 1314 receives a request 1316, it sends a "ticket" request to the agent manager 1320 so that the InteractiveServerAgent 1314 can communicate with the processing agent 1304. The agent manager 1302 gets the processing agent 1304 ready to "speak" with the InteractiveServerAgent 1314 and then sends the ticket 1322 to the InteractiveServerAgent 1314. The InteractiveServerAgent 1314 then redeems the ticket and begins speaking with the processing agent 1304 via requests 1324. The processing agent 1304 sends the responses 1326 back through the InteractiveServerAgent 1314, which then forwards those responses 1328 to the external application 1302.

Figure 14:
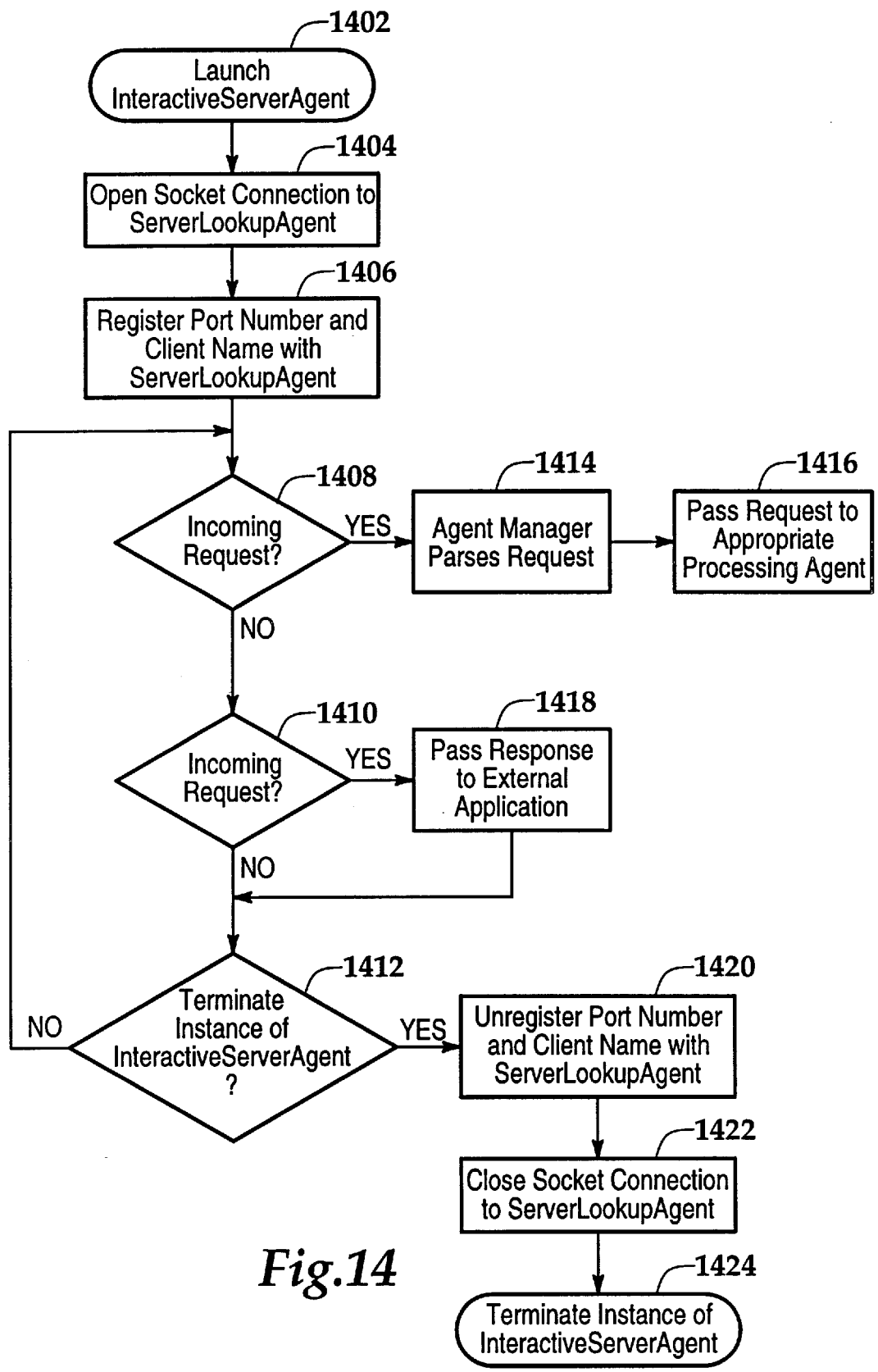
FIG. 14 is a block diagram illustrating an interactive server agent process in accordance with a preferred embodiment of the present invention.

Now referring also to FIG. 14, a block diagram of the InteractiveServerAgent 1314 process is illustrated and begins in block 1402 when the InteractiveServerAgent 1314 is launched. The InteractiveServerAgent 1314 requests an open socket connection to the ServerLookupAgent 1306 in block 1404, which is supplied by the operating system. The InteractiveServerAgent 1314 then registers the port number corresponding to the open socket connection and client name with the ServerLookupAgent 1306 in block 1406. Thereafter, the InteractiveServerAgent 1314 processes all incoming requests 1316 and responses 1326 to and from the external application 1302 and the appropriate processing agent 1304. If an incoming request 1316 has not been received, as determined in block 1408, and an incoming response 1326 has not been received, as determined in block 1410, and the InteractiveServerAgent 1314 is not to be terminated, as determined in block 1412, the process loops back to decision block 1408 and continues to look for incoming requests 1316, incoming responses 1326 or an instance termination signal.

Whenever an incoming request 1316 is received, as determined in decision block 1408, the request 1316 is parsed using the agent manager 1320 in block 1414 and then passed to the appropriate processing agent 1304 in block 1416. The process then continues to look for incoming requests 1316, incoming responses 1326 or an instance termination signal as previously described. Similarly, whenever an incoming response 1326 is received, as determined in decision block 1410, the response 1326 is passed to the external application 1302 in block 1418. The process then continues to look for incoming requests 1316, incoming responses 1326 or an instance termination signal as previously described. If an instance termination signal is received, as determined in decision block 1412, the InteractiveServerAgent 1312 unregisters the port number and client name with the ServerLookupAgent 1306 in block 1420, closes the socket connection to the ServerLookupAgent 1306 in block 1422 and terminates the instance of the InteractiveServerAgent 1312 in block 1424. Note that the InteractiveServerAgent 1312 runs continuously until the instance or thread of the InteractiveServerAgent 1312 is terminated. Typically, such a termination only occurs when the InteractiveServerAgent 1312 is taken down by hand.

As previously described, the ServerLookupAgent 1306 and InteractiveServerAgent 1312 allow multiple external applications 1302 to simultaneously connect with any client within the system. Any client in the system that desires to support this interactive interface will run an instance of the InteractiveServerAgent 1312. Each client will also run Agent instances for the various interactive functions it wishes to provide. Note that the client does not have to provide all possible functions or services. Accordingly, the set of processing Agents that are available are defined in the client's configuration file. Moreover, each agent participating in the interactive interface is designed to handle many requests from any external application 1302.

Although preferred embodiments of the invention have been described in detail, it will be understood by those skilled in the art that various modifications can be made therein without departing from the spirit and scope of the invention as set forth in the appended claims.

What is claimed is:

1. An apparatus for managing data comprising:
   a first database for storing system data;
   a second database for storing client data;
   at least one database server to control the first database and the second database;
   an external application;
   a first set of objects linked to the first database through the database server;
   a second set of objects linked to the second database through the database server;
   an interactive manager linked to the first set of objects and the external application;
   a set of minions linked to the second set of objects; and
   an agent manager linked to the interactive manager, the first set of objects and the set of minions.

2. The apparatus as recited in claim 1, wherein the client data is marketing data.

3. The apparatus as recited in claim 1, wherein the interactive manager is a first agent process and the agent manager is a second agent process.

4. The apparatus as recited in claim 3, wherein each agent process further comprises:
   an agent;

a connection linked to the agent that allows external access to the agent;

one or more minions linked to the agent; and an agent profile linked to the agent for specifying the one or more minions for the agent to manage.

5. The apparatus as recited in claim 4, wherein the agent is a generic, independently executable computer program.

6. The apparatus as recited in claim 4, wherein the agent serves as a distribution and control mechanism for the one or more minions.

7. The apparatus as recited in claim 1, wherein the external application is a web-based application.

8. The apparatus as recited in claim 1, wherein the interactive manager comprises a server lookup agent and an interactive server agent.

9. The apparatus as recited in claim 8, wherein the server lookup agent stores and maintains connection information for the interactive server agent.

10. The apparatus as recited in claim 8, wherein the interactive server agent provides an interface between the external application and the agent manager and the first set of objects.

11. The apparatus as recited in claim 1, wherein the interactive manager is only allowed to interface with a predefined set of processing agents.

12. The apparatus as recited in claim 1, further comprising a security guard linked to the first set of objects, the agent manager and the external application.

13. The apparatus as recited in claim 12, wherein the security guard is a fourth agent process.

14. The apparatus as recited in claim 1, wherein each minion further comprises:

a control data block;

a control thread linked to the agent for receiving a control message from the agent, posting the control message in the control data block, observing a progress report posted in the control data block and sending the progress report to the agent; and a work thread linked to an object for performing some work with a resource, creating the progress report, posting the progress report in the control data block, observing the control message posted in the control data block and executing the control message.

15. The apparatus as recited in claim 1, wherein each minion is a named class instance.

16. A computer program embodied on a computer-readable medium for managing data, the computer program comprising:

at least one code segment to control system data stored in a first database and client data stored in a second database;

a code segment defining a first set of objects linked to the first database;

a code segment defining a second set of objects linked to the second database;

a code segment defining one or more minions;

a code segment to manage one or more agent processes; and a code segment to allow interaction between an external application and the code segment to manage the one or more agent processes and the code segment defining a first set of objects.

17. The computer program for managing data as recited in claim 16, further comprising:

a code segment for receiving client data to be stored in the second database; and a code segment for parsing the client data into one or more data records, each data record having one or more data elements.

18. The computer program for managing data as recited in claim 16, wherein the client data comprises marketing data.

19. The computer program for managing data as recited in claim 16, wherein the external application is a web-based application.

20. The computer program for managing data as recited in claim 16, wherein the interaction code segment comprises:

a code segment for storing and maintaining connection information for the agent processes; and a code segment for providing an interface between the external application and the agent processes and the first set of objects.

21. The computer program for managing data as recited in claim 16, further comprising a code segment to prevent unauthorized access to the first database, the second database, the first set of objects, the second set of objects, the one or more minions, the job queue, or the one or more agent processes.

22. A database system comprising:

two or more computers communicably linked to each other through a network;

a data storage tier resident on at least one of the computers, the data storage tier having a first database for storing system data, a second database for storing client data and at least one database server to control the first database and the second database;

a user interface tier resident on at least one of the computers, the user interface tier having an external application; and an object tier resident on at least one of the computers, the object tier comprising a first set of objects linked to the first database through the database server, a second set of objects linked to the second database through the database server, an interactive manager resident on one of the computers in which the object tier is resident, the interactive manager linked to the first set of objects and the external application, a set of minions linked to the second set of objects, an agent manger resident on each computer in which the object tier is resident, the agent manager linked to the interactive manager, the first set of objects and the set of minions.

23. The database system as recited in claim 22, wherein the client data is marketing data.

24. The database system as recited in claim 22, wherein the interactive manager is a first agent process and the agent manager is a second agent process.

25. The database system as recited in claim 24, wherein each agent process further comprises:

an agent;

a connection linked to the agent that allows external access to the agent;

one or more minions linked to the agent; and an agent profile linked to the agent for specifying the one or more minions for the agent to manage.

26. The database system as recited in claim 25, wherein the agent is a generic, independently executable computer program.

27. The database system as recited in claim 25, wherein each minion further comprises:

a control data block;

a control thread linked to the agent for receiving a control message from the agent, posting the control message in the control data block, observing a progress report posted in the control data block and sending the progress report to the agent; and a work thread linked to an object for performing some work with a resource, creating the progress report, posting the progress report in the control data block, observing the control message posted in the control data block and executing the control message.

28. The database system as recited in claim 25, wherein each minion is a named class instance.

29. The database system as recited in claim 26, wherein the agent serves as a distribution and control mechanism for the one or more minions.

30. The database system as recited in claim 22, wherein the object tier further comprises a notification manager linked to the first set of objects and the interactive manager.

31. The database system as recited in claim 30, wherein the notification manager is a third agent process.

32. The database system as recited in claim 22, wherein the object tier further comprises a security guard linked to the first set of objects, the agent manager and the external application.

33. The database system as recited in claim 32, wherein the security guard is a fourth agent process.

34. The database system as recited in claim 33, wherein the security guard prevents unauthorized access to the object tier and the data storage tier.

35. The database system as recited in claim 22, wherein the network is an Internet.

36. The database system as recited in claim 22, wherein the network is a local area network.

37. The database system as recited in claim 22, wherein the external application is a web-based application.

38. The database system as recited in claim 22, wherein the interactive manager comprises a server lookup agent and an interactive server agent.

39. The database system as recited in claim 38, wherein the server lookup agent stores and maintains connection information for the interactive server agent.

40. The database system as recited in claim 38, wherein the interactive server agent provides an interface between the external application and the agent manager and the first set of objects.

* * * * *